(12) United States Patent
Zeine et al.

(10) Patent No.: US 11,081,907 B2
(45) Date of Patent: *Aug. 3, 2021

(54) TECHNIQUES FOR DETERMINING DISTANCE BETWEEN RADIATING OBJECTS IN MULTIPATH WIRELESS POWER DELIVERY ENVIRONMENTS

(71) Applicant: Ossia Inc., Bellevue, WA (US)

(72) Inventors: Hatem Zeine, Bellevue, WA (US); Siamak Ebadi, Bellevue, WA (US); Douglas Wayne Williams, Seattle, WA (US); Anas Alfarra, Bellevue, WA (US)

(73) Assignee: Ossia Inc., Redmond, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/598,147

(22) Filed: Oct. 10, 2019

(65) Prior Publication Data

US 2020/0044489 A1 Feb. 6, 2020

Related U.S. Application Data

(63) Continuation of application No. 14/815,893, filed on Jul. 31, 2015, now Pat. No. 10,447,092.

(Continued)

(51) Int. Cl.
*H02J 50/20* (2016.01)
*H02J 50/80* (2016.01)
(Continued)

(52) U.S. Cl.
CPC .............. *H02J 50/20* (2016.02); *G01S 11/00* (2013.01); *G01S 11/06* (2013.01); *H02J 7/025* (2013.01);
(Continued)

(58) Field of Classification Search
CPC .. H02J 50/20; H02J 50/23; H02J 50/60; H02J 50/40; H02J 50/80; H02J 7/025;
(Continued)

(56) References Cited

U.S. PATENT DOCUMENTS 3,989,994 A 11/1976 Brown
4,257,050 A 3/1981 Ploussios
(Continued)

FOREIGN PATENT DOCUMENTS

EP 2160814 A2 3/2010
EP 2609670 A1 7/2013
(Continued)

OTHER PUBLICATIONS

Calouro, Eric, "Wireless Charging? Nokia's Newest Prototype Phone Has It," Erictric Media, 6 pages, Jun. 17, 2009.
(Continued)

*Primary Examiner* — John W Poos
*Assistant Examiner* — Alex W Lam

(57) ABSTRACT

Techniques are described herein for determining the distance from, to or between radiating objects in a multipath environment. For example, embodiments of the present disclosure describe techniques for determining the distance between an antenna array system (or wireless charger) and a wireless power receiver in a multipath wireless power delivery environment. Calibration techniques are disclosed that account for and/or otherwise quantify the multipath effects of the wireless power delivery environment. In some embodiment, the quantified multipath effects modify the Friis transmission equation, thereby facilitating the distance determination in multipath environments.

20 Claims, 18 Drawing Sheets

Related U.S. Application Data

(60) Provisional application No. 62/031,535, filed on Jul. 31, 2014.

(51) Int. Cl.
- *H02J 50/40* (2016.01)
- *H02J 7/02* (2016.01)
- *H02J 50/60* (2016.01)
- *G01S 11/00* (2006.01)
- *G01S 11/06* (2006.01)

(52) U.S. Cl.
CPC ............ *H02J 50/40* (2016.02); *H02J 50/60* (2016.02); *H02J 50/80* (2016.02)

(58) Field of Classification Search
CPC ........ G01S 11/00; G01S 11/06; H04W 48/12; H01Q 3/30
See application file for complete search history.

(56) References Cited

U.S. PATENT DOCUMENTS

| | | |
|---|---|---|
| 4,361,892 A | 11/1982 | Martin |
| 4,685,047 A | 8/1987 | Phillips, Sr. |
| 4,779,097 A | 10/1988 | Morchin |
| 5,000,037 A | 3/1991 | Baresh |
| 5,218,374 A | 6/1993 | Koert et al. |
| 5,223,781 A | 6/1993 | Criswell et al. |
| 5,400,037 A | 3/1995 | East |
| 5,486,833 A | 1/1996 | Barrett |
| 5,503,350 A | 4/1996 | Foote |
| 5,630,208 A | 5/1997 | Enge et al. |
| 5,733,313 A | 3/1998 | Barreras, Sr. et al. |
| 6,114,834 A | 9/2000 | Parise |
| 6,127,799 A | 10/2000 | Krishnan |
| 6,313,786 B1 | 11/2001 | Sheynblat et al. |
| 6,474,341 B1 | 11/2002 | Hunter et al. |
| 6,615,074 B2 | 9/2003 | Mickle et al. |
| 6,621,470 B1 | 9/2003 | Boeringer et al. |
| 6,690,324 B2 | 2/2004 | Vail et al. |
| 6,700,538 B1 | 3/2004 | Richards |
| 6,721,159 B2 | 4/2004 | Takashige et al. |
| 6,738,017 B2 | 5/2004 | Jacomb-Hood |
| 6,856,291 B2 | 2/2005 | Mickle et al. |
| 6,882,128 B1 | 4/2005 | Rahmel et al. |
| 6,967,462 B1 | 11/2005 | Landis |
| 7,068,991 B2 | 6/2006 | Parise |
| 7,084,605 B2 | 8/2006 | Mickle et al. |
| 7,652,625 B2 | 1/2010 | Small |
| 7,744,032 B2 | 6/2010 | Quinn et al. |
| 8,159,364 B2 | 4/2012 | Zeine |
| 8,410,953 B2 | 4/2013 | Zeine |
| 8,446,248 B2 | 5/2013 | Zeine |
| 8,558,661 B2 | 10/2013 | Zeine |
| 8,854,176 B2 | 10/2014 | Zeine |
| 9,014,644 B2 | 4/2015 | Cahill |
| 9,142,973 B2 | 9/2015 | Zeine |
| 9,237,422 B1 | 1/2016 | Bhat et al. |
| 2001/0022558 A1 | 9/2001 | Karr, Jr. et al. |
| 2002/0057219 A1 | 5/2002 | Obayashi |
| 2002/0142782 A1* | 10/2002 | Berliner .................. G01S 11/02 455/456.1 |
| 2004/0032363 A1 | 2/2004 | Schantz et al. |
| 2004/0140929 A1 | 7/2004 | Toda et al. |
| 2005/0184908 A1 | 8/2005 | Richards |
| 2006/0224489 A1 | 10/2006 | Pantelis et al. |
| 2007/0142061 A1 | 6/2007 | Taubenheim et al. |
| 2008/0009321 A1 | 1/2008 | Sayeed et al. |
| 2008/0014897 A1 | 1/2008 | Cook et al. |
| 2008/0042847 A1 | 2/2008 | Hollister et al. |
| 2008/0280625 A1 | 11/2008 | Larsen |
| 2009/0284220 A1 | 11/2009 | Toncich et al. |
| 2010/0033021 A1 | 2/2010 | Bennett |
| 2010/0133920 A1 | 6/2010 | Joannopoulos et al. |
| 2010/0315045 A1* | 12/2010 | Zeine ..................... H02J 50/40 320/137 |
| 2012/0176227 A1 | 7/2012 | Nikitin |
| 2013/0035109 A1 | 2/2013 | Tsruya et al. |
| 2013/0039390 A1 | 2/2013 | Vallette |
| 2013/0130675 A1 | 5/2013 | Yi et al. |
| 2013/0288705 A1 | 10/2013 | Ahn et al. |
| 2013/0344815 A1 | 12/2013 | Cahill |
| 2014/0171107 A1 | 6/2014 | Kao et al. |
| 2014/0175893 A1 | 6/2014 | Sengupta et al. |
| 2015/0035376 A1 | 2/2015 | Baarman et al. |
| 2015/0042526 A1 | 2/2015 | Zeine |
| 2016/0013685 A1 | 1/2016 | Zeine |
| 2018/0241255 A1 | 8/2018 | Leabman |

FOREIGN PATENT DOCUMENTS

| | | |
|---|---|---|
| JP | 7-236204 A | 9/1995 |
| JP | 8-37743 A | 2/1996 |
| JP | 8-103039 A | 4/1996 |
| JP | 8-130840 A | 5/1996 |
| JP | 2002-84685 A | 3/2002 |
| JP | 2002-152995 A | 5/2002 |
| JP | 2004-229427 A | 8/2004 |
| JP | 2005-261187 A | 9/2005 |
| JP | 2007-22382 A | 2/2007 |
| KR | 2005-0096068 A | 10/2005 |
| KR | 10-0654623 B1 | 11/2006 |
| KR | 2007-0055086 A | 5/2007 |
| WO | 2001/03438 A2 | 1/2001 |
| WO | 2008/156571 A2 | 12/2008 |
| WO | 2012/027166 A1 | 3/2012 |
| WO | 2016/019362 A1 | 2/2016 |

OTHER PUBLICATIONS

Goldoni, Emanuele et al., "Experimental Analysis of RSSI-Based Indoor Localization With IEEE 802.15.4," 2010 European Wireless Conference, IEEE, pp. 71-77, Apr. 12-15, 2010.
Murali, K., "Smart Antennas for Wireless Mobile Communication," Webcom Communications Corp., 12 pages, Oct. 2004.

* cited by examiner

TECHNIQUES FOR DETERMINING DISTANCE BETWEEN RADIATING OBJECTS IN MULTIPATH WIRELESS POWER DELIVERY ENVIRONMENTS

CROSS-REFERENCE TO RELATED APPLICATIONS

This application is a continuation of U.S. patent application Ser. No. 14/815,893 filed on Jul. 31, 2015, and issued as U.S. Pat. No. 10,447,092 on Oct. 15, 2019; which claims priority to and benefit from U.S. Provisional Patent Application No. 62/031,535 filed on Jul. 31, 2014, both of which are expressly incorporated by reference herein in their entireties.

BACKGROUND

The distance between two objects can be calculated using the Friis transmission equation. In its simplest form, the Friis transmission equation provides for the determination of power received by a receive antenna under idealized conditions given a transmit antenna some distance away transmitting at known amount of power. More specifically, the Friis transmission equation recites:

$$P_r = G_t G_r \left(\frac{\lambda}{4\pi R}\right)^2 \cdot P_t$$

Where,
R is the range or distance between the transmit antenna and the receive antenna;
$G_t$ is the transmitter antenna(s) gain;
$G_r$ is the receiver antenna(s) gain;
$P_t$ is the power at which a signal is transmitted by a radiating object;
$P_r$ is the power at which the signal is received by the radiating object; and
$\lambda$ is the wavelength of the operating frequency.

Consequently, by knowing the transmitted and received power, antenna gain values, and the wavelength, the unknown range R (or distance) between the transmit antenna and the receive antenna can be determined using the Friis transmission equation. The Friis transmission equation assumes operation in free space with the absence of any multipath. Multipath is the propagation phenomenon that results in radio signals reaching the receiving antenna by two or more paths. The effects of multipath include constructive and destructive interference, and phase shifting of the signal. In other words, a single path of energy flow between the transmitter and the receiver in free space will be replaced with multiple paths of energy flow caused by reflections from the objects and surfaces existing in the environment. Causes of multipath can include atmospheric ducting, ionospheric reflection and refraction, and reflection from water bodies and terrestrial objects such as mountains and buildings.

As a real time application, it is very beneficial to efficiently calculate the distance between an array and a wireless receiver (e.g. "client or receiver") in wireless power delivery environment. Unfortunately, wireless power delivery environments (e.g., home, office, retail, etc.) often include multipath as walls and other Radio Frequency (RF) reflective objects affect and/or otherwise obstruct direct line of sight between the transmitting and receiving objects.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
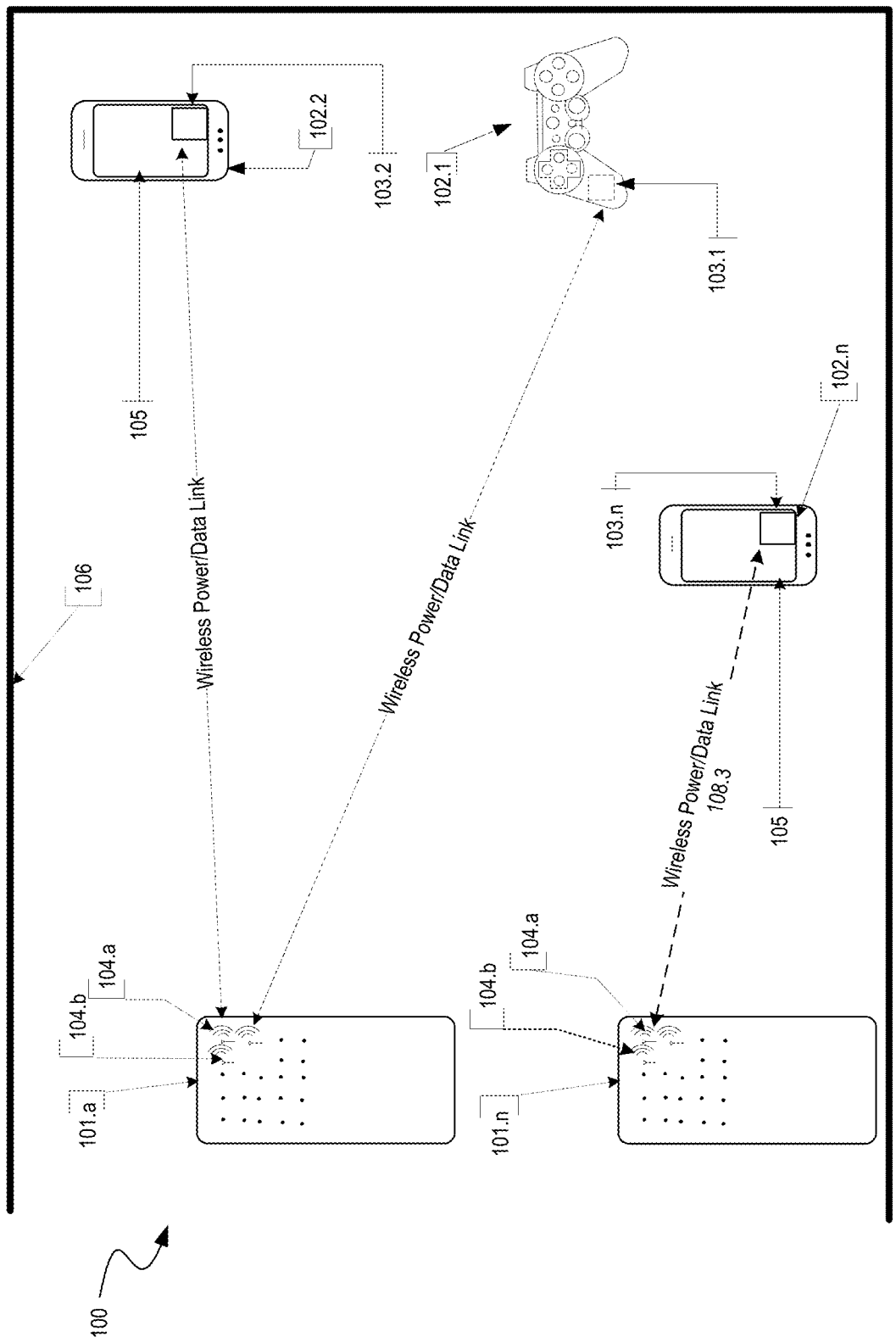
FIG. 1 is a block diagram illustrating an example wireless power delivery environment depicting wireless power delivery from one or more wireless chargers to various wireless devices within the wireless power delivery environment.

Techniques are described herein for determining the distance between radiating objects in a multipath environment. More specifically, embodiments of the present disclosure describe techniques for determining the distance between an antenna array system (or wireless charger) and one or more paired wireless power receivers in a multipath wireless power delivery environment. Calibration techniques are disclosed that account for and/or otherwise quantify the multipath effects of the wireless power delivery environment. In some embodiment, the quantified multipath effects modify the Friis transmission equation facilitating the distance determination in multipath environments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the present disclosure describe techniques for determining the distance between an array of antennas (or charger) and one or more paired wireless devices. More specifically, the present disclosure describe techniques for determining the distance between two radiating objects in a one-way (without roundtrip) manner in any complex, highly-multipath, environment. A radiating object can be any object, device, apparatus, system, etc. capable of functioning as described herein. By way of example and not limitation, a radiating object can be a charger, an antenna array, a wireless device, or a wireless power receiver.

Furthermore, both radiating objects do not necessarily need to be transmitting or emitting in order to make a distance determination as discussed herein. Rather, in some embodiments, a radiating object that is receiving signals can perform the calibration techniques discussed herein and subsequently make a distance determination. For example, a receiving device (e.g., an array with multiple antennas) can receive signals (e.g., beacon and/or other calibration signals) from one or more other transmitting devices in the environment (wireless devices, clients, or calibration antennas). The receiving device can calibrate the environment using the received signals and/or make a distance determination using a received signal if the environment has been calibrated.

As disclosed herein, the distance determination techniques can be performed at an antenna array system (or charger) and/or a paired wireless device having one or more wireless power receivers. The techniques for measuring the distance between an array of antennas and one or more paired wireless devices can be used for a variety of functions. By way of example and not limitation, the distance measuring techniques described herein can be used in car key and other door lock applications, head set pairing applications, various military applications such as firing trajectories when in the near zone of a canon/weapon/etc., to lessen safety hazards, various medical applications to enhance access and reduce complications for physicians, various security applications such as home lighting/surveillance recording/etc.

In some embodiments, determining the distance between the charger and the client allows the charger to provide the necessary power levels to the wireless receivers in the vicinity. Over powering or under powering the wireless receivers would either not provide enough power or providing additional power which can create a safety hazard. This can play important role for medical applications, and the like.

Any headings provided herein are for convenience only and do not necessarily affect the scope or meaning of the claimed invention.

I. Wireless Charging System Overview/Architecture

FIG. 1 is a diagram illustrating an example wireless power delivery environment 100 depicting wireless power delivery from one or more wireless chargers 101 to various wireless devices 102 within the wireless power delivery environment. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, that are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems.

The wireless devices 102 can include one or more receive power clients 103. As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103.1-103 and/or the wireless devices 102.1-102.n. In some embodiments, the data communication antennas can communicate via Bluetooth, Wi-Fi, ZigBee, etc.

Each power receiver client 103.1-103.n includes one or more antennas (not shown) for receiving signals from the chargers 101. Likewise, each charger 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.a-101.n can be connected to a power source such as, for example, a power outlet or source connecting the chargers to a standard or primary alternating current (AC) power supply in a building. Alternatively or additionally, one or more of the chargers 101.a-101.n can be powered by a battery or via other mechanisms.

In some embodiments, the power receiver clients 102.1-102.n and/or the chargers 101.a-101.n utilize reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.n can be any system and/or device, and/or any combination of devices/systems that can establish a connection with another device, a server and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.n can each include a data communication module for communication via a data channel. Alternatively or additionally, the power receiver clients 103.1-103.n can direct the wireless devices 102.1-102.n to communicate with the charger via existing data communications modules.

Additionally, in some embodiments the beacon signal, which is primarily referred to herein as a continuous waveform, can alternatively or additionally take the form of a modulated signal.

Figure 2:
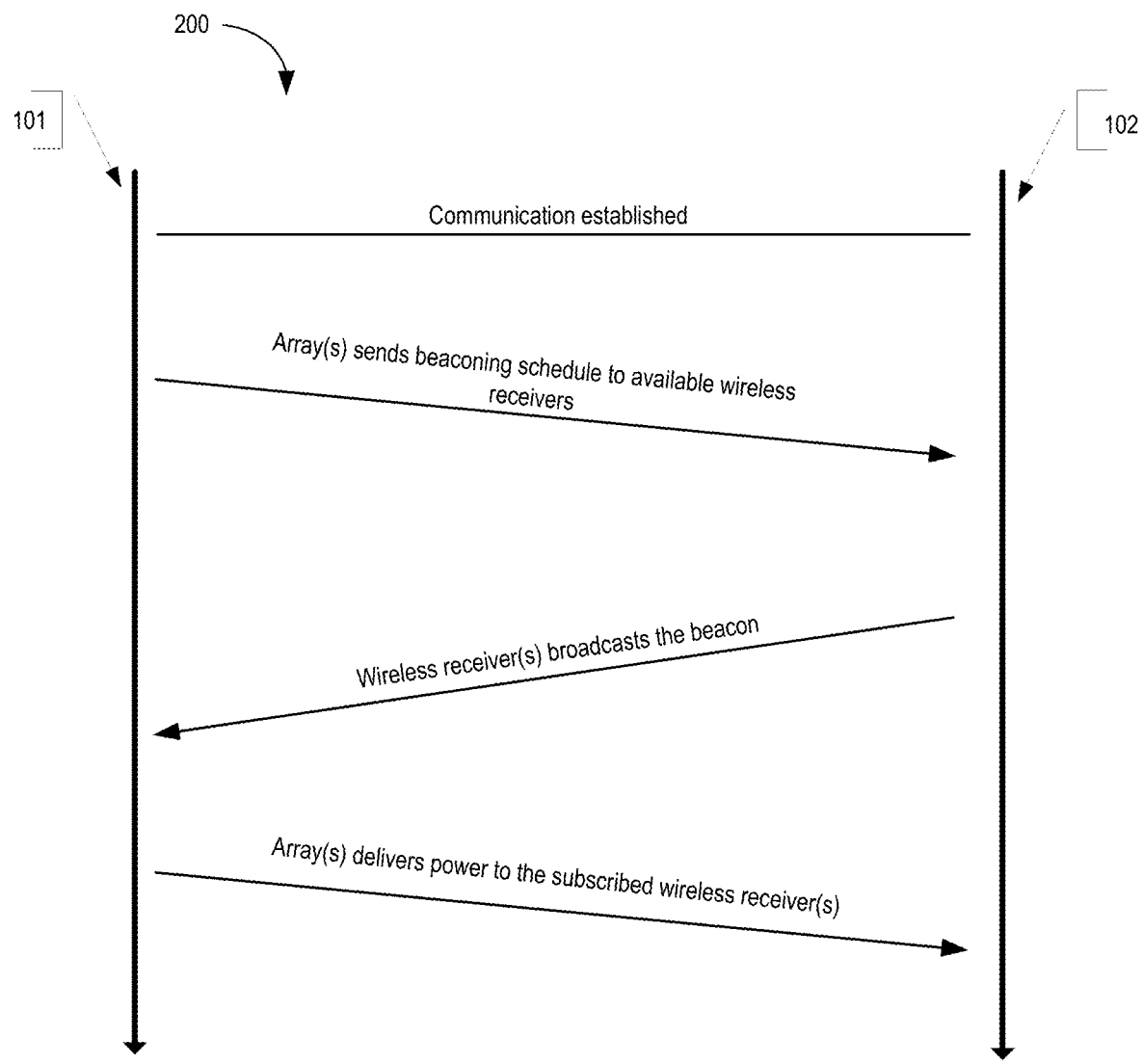
FIG. 2 is a sequence diagram illustrating example operations between a wireless charger and a wireless receiver device for commencing wireless power delivery, according to an embodiment.

FIG. 2 is a sequence diagram 200 illustrating example operations between a wireless charger 101 and a power receiver client 103 for commencing wireless power delivery, according to an embodiment. Initially, communication is established between the charger 101 and the power receiver client 103. The charger 101 subsequently sends a beaconing schedule to the power receiver client 103 to arrange the beacon broadcasting and the RF power/data delivery schedule. Based on the schedule, the power receiver client 103 broadcasts the beacon. As shown, the charger 101 receives the beacon from the power receiver client 103 and detects the phase (or direction) at which the beacon signal was received. The charger 101 then delivers wireless power and/or data to the power receiver client 103 based the phase (or direction) of the received beacon. That is, the charger 101 determines the complex conjugate of the phase and uses the complex conjugate to deliver power to the power receiver client 103 in the same direction in which the beacon signal was received from the power receiver client 103.

In some embodiments, the charger 101 includes many antennas; one or more of which are used to deliver power to the power receiver client 103. The charger 101 can detect phases of the beacon signals that are received at each antenna. The large number of antennas may result in different beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As described herein, wireless power can be delivered in power cycles. A more detailed example of the signaling required to commence wireless power delivery is described below with reference to FIG. 3. As discussed herein, once paired, the charger and the client have an established link for transmission of RF power and for communication of data. The following example describes an example of the system power cycle (which includes the pairing process) according to an embodiment.

To begin, a master bus controller (MBC), which controls the charger array, receives power from a power source and is activates. The MBC activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates a Beacon Beat Schedule (BBS) cycle, and a Power Schedule (PS) for all wireless power receiver clients that are to receive power based on their corresponding properties and/or requirements. The MBC also identifies any other available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer it has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 3:
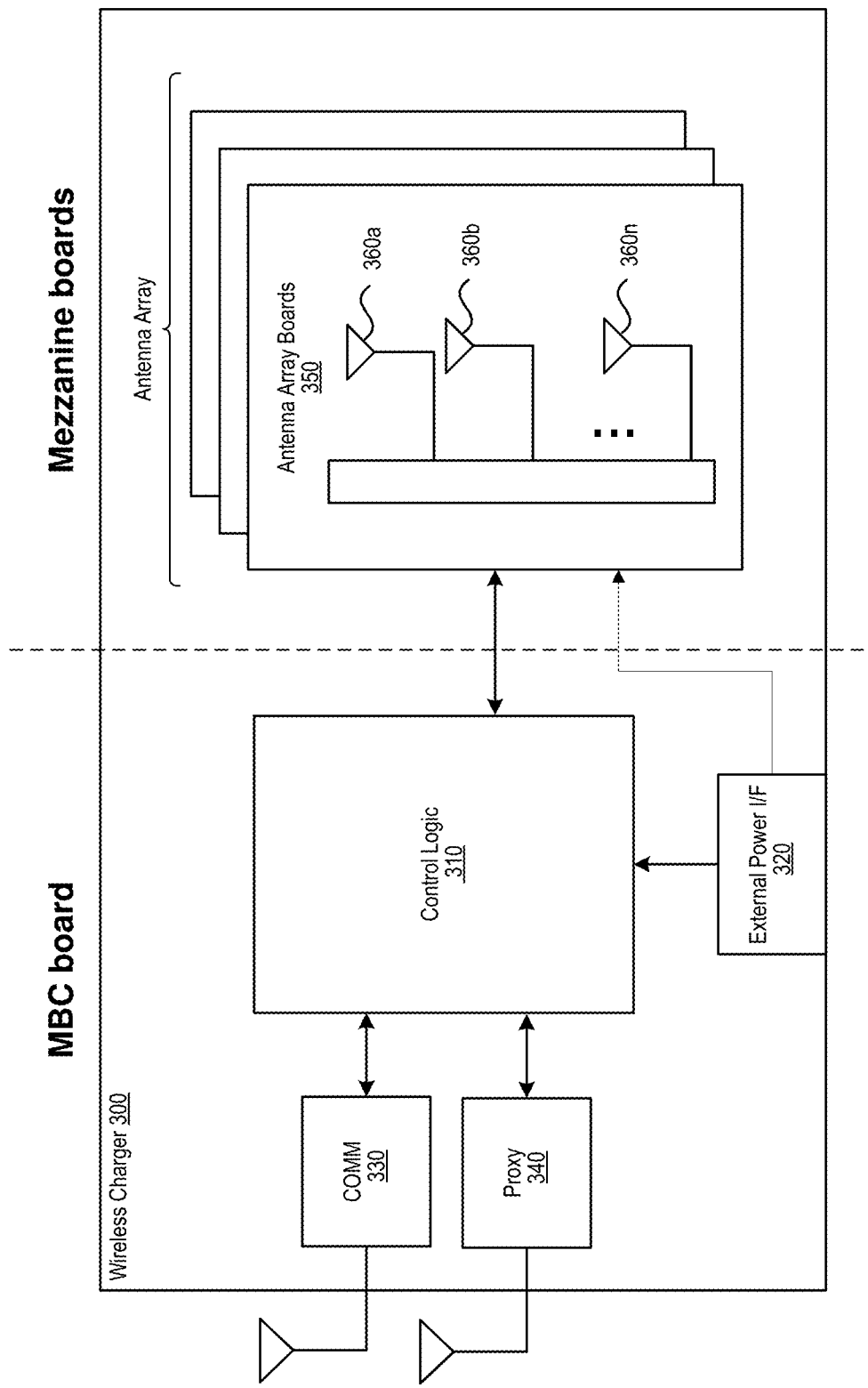
FIG. 3 is a block diagram illustrating example components of a wireless power transmitter (charger) in accordance with an embodiment.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external power interface (I/F) 320, a communication block 330, and proxy 340. The mezzanine (or antenna array boards 350) each include multiple antennas 360a-360n. Some or all of the components can be omitted in some embodiments. Additional components are also possible.

The control logic 310 is configured to provide all control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc. Likewise, the proxy 340 can communicate with clients via data communications as discussed herein. The data communications can be Bluetooth, Wi-Fi, ZigBee, etc. The external power interface 320 is configured to receive external power and provide the power to various components. In some embodiments, the external power interface 320 may be configured to receive a standard external 24 Volt power supply. Alternative configurations are also possible.

Figure 4:
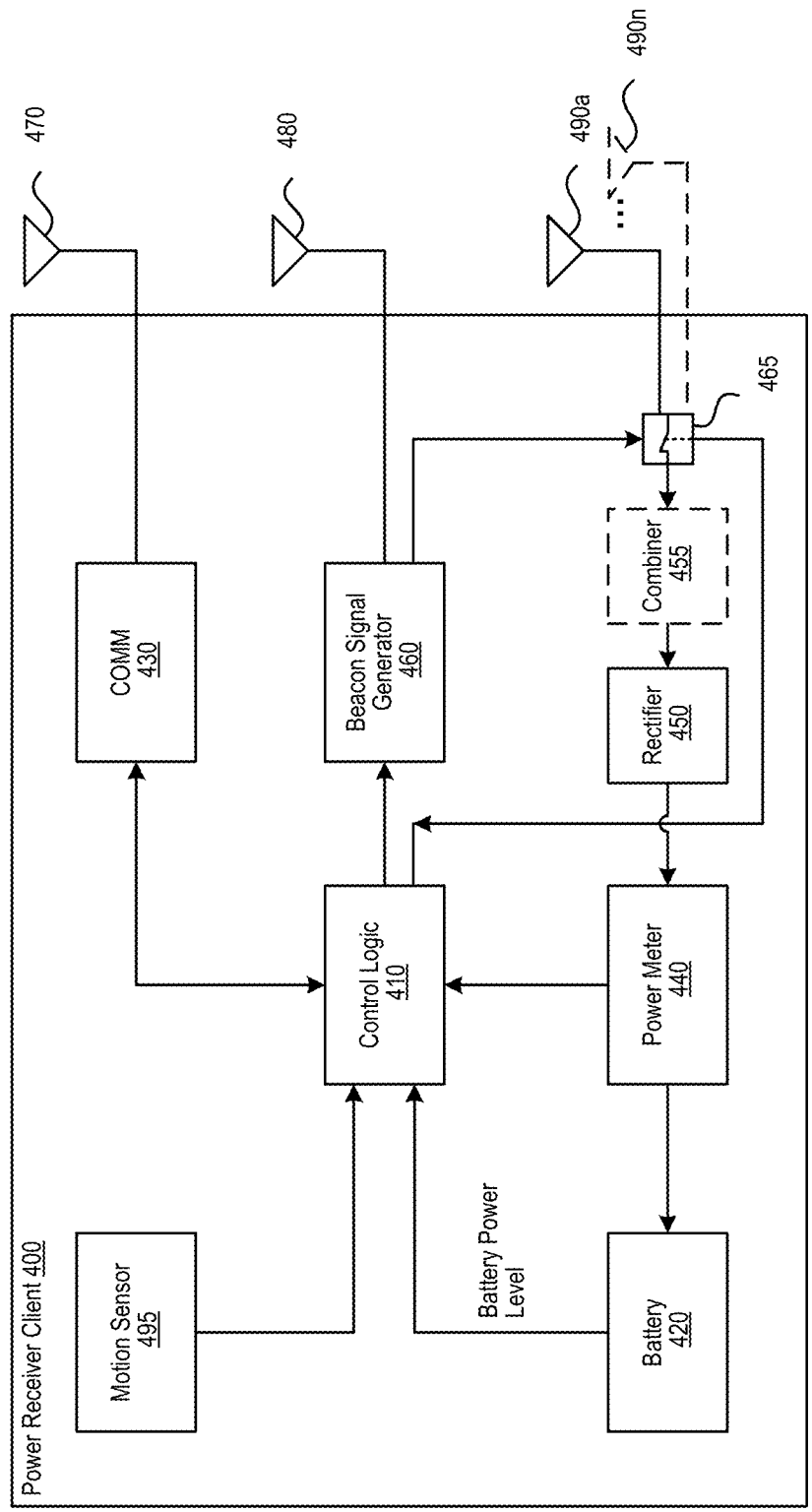
FIG. 4 is a block diagram illustrating example components of a wireless power receiver (client) in accordance with an embodiment.

FIG. 4 is a block diagram illustrating example components of a wireless power receiver (client), in accordance with some embodiments. As illustrated in the example of FIG. 4, the receiver 400 includes control logic 410, battery 420, communication block 430 and associated antenna 470, power meter 440, rectifier 450, a combiner 455, beacon signal generator 460 and an associated antenna 480, and switch 465 connecting the rectifier 450 or the beacon signal generator 460 to one or more associated antennas 490a-n. Some or all of the components can be omitted in some embodiments. Additional components are also possible.

A combiner 455 receives and combines the received power transmission signals from the power transmitter in the event that the receiver 400 has more than one antenna. The combiner 455 can be any combiner or divider circuit that is configured to achieve isolation between the output ports while maintaining a matched condition. For example, the combiner 455 can be a Wilkinson Power Divider circuit.

The rectifier 450 receives the combined power transmission signal from the combiner 455, if present, which is fed through the power meter 440 to the battery 420 for charging. The power meter 440 measures the received power signal strength and provides the control logic 410 with this measurement. The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 transmits the beacon signal, or calibration signal, using either the antenna 480 or 490. It may be noted that, although the battery 420 is shown for being charged and for providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna. The motion sensor 495 detects motion and signals the control logic 410 to act in accordance with the technique described below.

For example, when a device is receiving power at high frequencies above 500 MHz, its location may become a hotspot of (incoming) radiation. So when the device is on a person, the level of radiation may exceed the FCC regulation or exceed acceptable radiation levels set by medical/industrial authorities. To avoid any over-radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

II. Multi-Path Distance Determination

Various techniques and examples for determining the distance between radiating objects in a multipath environment are described in more detail below. More specifically, the embodiments below describe techniques for quantifying the multipath effects of a wireless power delivery environment and determining the distance between an antenna array system (e.g., charger 101) and a paired wireless power receiver (e.g., wireless power receiver 103) embedded or otherwise include in a wireless device 103 based on the quantified multipath effects.

As discussed herein, both radiating objects do not necessarily need to be transmitting or emitting in order to make a distance determination. Rather, in some embodiments, a radiating object that is receiving signals can perform the calibration techniques discussed herein and subsequently make a distance determination. For example, a receiving device (e.g., an array with multiple antennas) can receive signals (e.g., beacon and/or other calibration signals) from one or more other transmitting devices in the environment (wireless devices, clients, or calibration antennas). The receiving device can calibrate the environment using the received signals and/or make a distance determination using a received signal if the environment has been calibrated.

As discussed above, calibration techniques are disclosed that account for and/or otherwise quantify the multipath effects of the wireless power delivery environment. Specifically, a new function F(Environment, R), is incorporated into the Friis transmission equation to account for and/or otherwise quantify the multipath effects of the wireless power delivery environment. F(Environment, R) depends on two variables: Range (or distance), which is a desired unknown, and the environment itself. As will be discussed in greater detail below, this function provides valuable insight into mapping a multipath environment into an equation otherwise useful only in a free-space environment.

In some embodiments, the modified Friis transmission equation, when solving for unknown R, recites:

$$R = \sqrt{F(\text{Environment}, R) \cdot G_t \cdot G_r \cdot \frac{P_t}{P_r} \cdot \left(\frac{\lambda}{4\pi}\right)^2}$$

The above modified Friis equation is the general solution and includes all possible configurations. In special cases, and assuming the multipath loss is a separable function of environment and range, the modified Friis equation recites:

$$\frac{R}{F2(R)} = \sqrt{F1(\text{Environment}) \cdot G_t \cdot G_r \cdot \frac{P_t}{P_r} \cdot \left(\frac{\lambda}{4\pi}\right)^2}$$

Where, F(Environment, R)=F1(Environment).F2(R) represents the quantified multipath effects of the wireless power delivery environment taking into consideration the range between the antenna array system and the client in addition to the signal losses or gains in the environment where the charger and the wireless receiver are present. In some embodiments, F(Environment) is calculated in the calibration process which is discussed in greater detail with reference to FIGS. 8 and 9. When operating in free space, both the F1(Environment) and F2(R) functions are simplified to unity.

Figure 5:
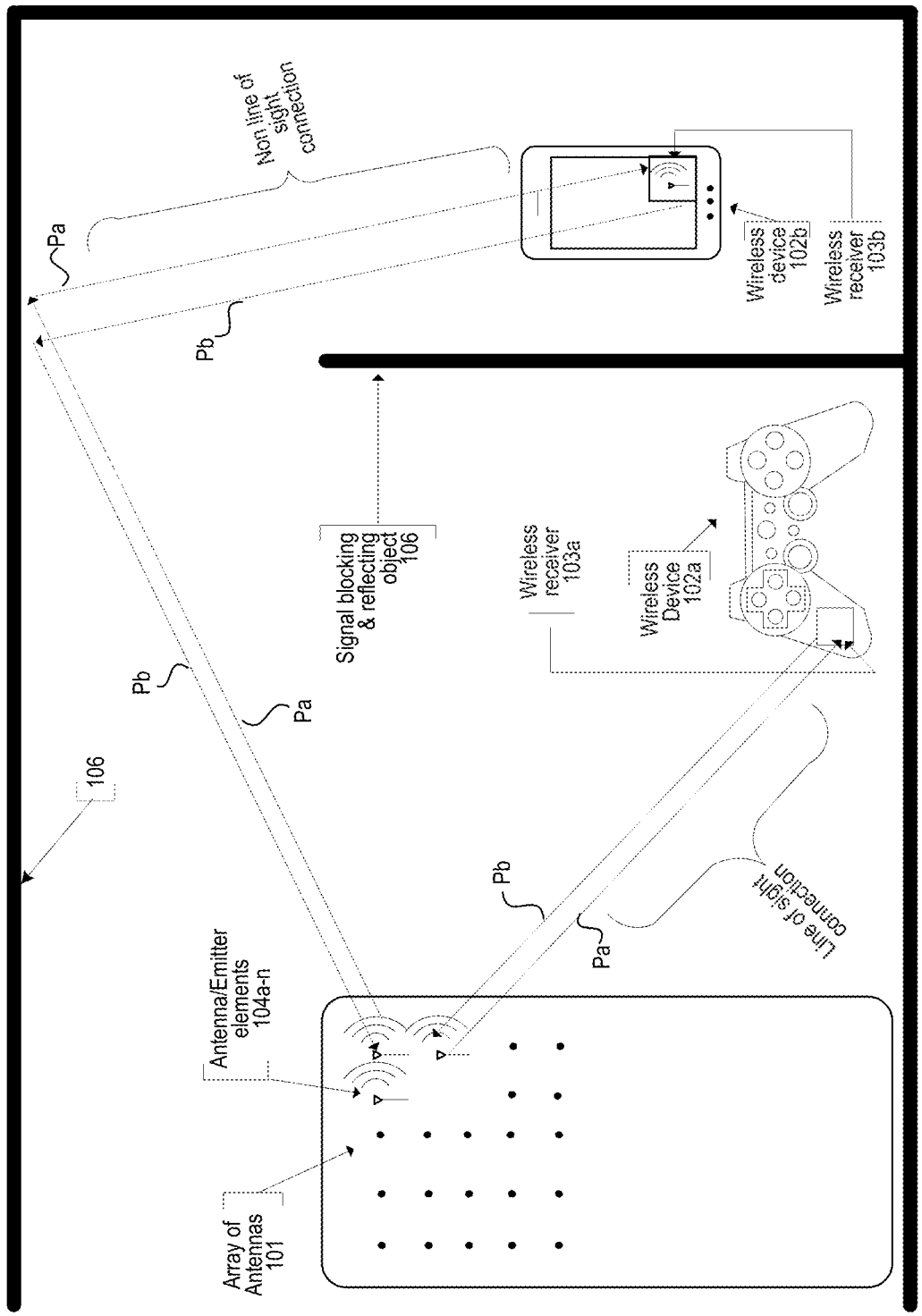
FIG. 5 is a diagram illustrating an example multi-path environment in which techniques for facilitating distance determinations between radiating objects can be achieved, according to an embodiment.

FIG. 5 is a diagram illustrating an example multi-path environment 500 in which techniques for facilitating distance determinations between radiating objects can be achieved, according to an embodiment. More specifically, the example of FIG. 5 illustrates wireless power receivers 103a and 103b embedded and/or otherwise included in respective wireless devices 102a (in line-of-sight connection with array) and 102b (non-line-of-sight connection with array) communicating with an array of antennas (or charger) 101.

As a preliminary matter, the example of FIG. 5 assumes that a calibration procedure or process has been performed by the antenna array system to quantify and/or otherwise account for the environmental effects of the multi-path environment on signals received by a radiating object within the environment. The calibration procedure or process is discussed in greater detail with reference to FIGS. 8 and 9. As described above, the distance between the wireless power receiver 103b and the array 101 can be calculated using the modified Friis equation once the calibration techniques disclosed herein have been performed.

Unlike radar situations in which the Friis equation is used to determine the distance between two objects, one of which is a passive device, both objects in a multipath wireless power delivery environment are radiating. Consequently, the modified Friis transmission equation can determine the distance without roundtrip in a multipath environment. That is, only a single, one-way, transfer of energy is needed to make the determine determination using the modified Friis transmission equation. For example, with reference to FIG. 5, an array of antennas 101 (e.g., antenna array system or charger) can receive a beacon signal Pb transmitted by a wireless power receiver 103 embedded in a wireless device 102. The array of antennas 101 can measure the received power level (e.g., signal strength, amplitude, etc.) of the beacon signal Pb and determine the distance between the array of antennas 101 and the wireless power receiver 103 using the modified Friis equation assuming the other variables are known. In some embodiments, one or more of the other variables (e.g., $G_t$, $G_r$, $P_t$, and $\lambda$) can be pre-determined or standardized in the system, or communicated via a data channel (e.g., Wi-Fi or Bluetooth connection) between the array of antennas 101 and/or the wireless device 102.

Alternatively or additionally, the wireless power receiver 103 embedded in a wireless device 102 can receive a coherent signal Pa transmitted by an array of antennas 101 (e.g., antenna array system or charger), measure the received power level (e.g., signal strength, amplitude, etc.) of the coherent signal Pa, and determine the distance between the array of antennas 101 and the wireless power receiver 103 using the modified Friis equation assuming the other variables are known. Again, one or more of the other variables (e.g., $G_t$, $G_r$, $P_t$, and $\lambda$) can be pre-determined or standardized in the system, or communicated via a data channel (e.g., Wi-Fi or Bluetooth connection) between the array of antennas 101 and/or the wireless device 102.

In some embodiments, the information calculated or derived using the one-way transfer of energy (e.g., distance information) can be communicated via a second communication in reverse form (e.g., from the array of antennas 101 to the wireless power receiver 103 if measured at the array, or from the wireless power receiver 103 to the array of antennas 101 if measured at the wireless power receiver 103). In some embodiments, the second communication is not analyzed by the receiver (e.g., the array of antennas 101 or the wireless power receiver 103) to measure the power level of the received signal. Rather, the data (e.g., distance information) included with the second communication is extracted. Similar to the variables discussed above, the information calculated or derived using a one-way transfer of energy (e.g., distance information) can alternatively or additionally be communicated via a data channel (e.g., Wi-Fi or Bluetooth connection) between the array of antennas 101 and/or the wireless device 102.

Furthermore, despite the fact that only a single, one-way, transfer of energy is needed to make the distance determination using the modified Friis transmission equation disclosed herein, in some embodiments, a two-way (or two-step) measurement is made for measurement diversity. As discussed in greater detail below, a forward path distance determination may not be the same as a reverse path distance determination. Various information can be obtained and/or otherwise gleaned from the similarities and/or differences in the two measurements. As described herein, a two-way measurement includes at least one measurement in each direction (i.e., at least one measurement by each radiating object).

In a wireless power delivery environment, the two-way measurement is possible because both ends of the link are active devices (e.g., radiating objects) that collaborate and communication with one another. Conversely, with conventional radar measurements, the goal is to measure the distance to a passive device which is not an active device but merely reflects the original signal. Thus, some of the techniques described herein introduce measurement diversity by measuring the distance at least twice. For example, in some embodiments, after the multipath has been calibrated, the array of antennas 101 (or charger) sends a first signal to the wireless power receiver 103. The wireless power receiver 103 receives the signal, measures the power level, and calculates a first range (or distance) using the modified Friis transmission equation for the forward path. The wireless power receiver 103 then transmits a second signal which the array of antennas 101 (or charger) receives, measures the power level, and calculate a second range (or distance) using the modified Friis equation for the return path. The second signal can include information about the first distance measurement and optionally other necessary variables for calculating the range using the modified Friis equation. Alternatively or additionally, the information about the first distance measurement and/or any necessary variables for calculating the range using the modified Friis equation can be communicated via a data channel (e.g., Wi-Fi or Bluetooth connection) between the array of antennas 101 and/or the wireless device 102. Additional examples of distance determination are shown and discussed in greater detail with reference to FIGS. 14A-14G.

Advantageously, the measurement diversity techniques described herein reduce the error as, in practice, all practical measurements are prone to error. Theoretically, and assuming operation in free space, the two calculations should provide identical results. However, in a multipath environment, one or both of the calculations can include information that is missing in the other calculation. The information becomes more evident as the contours and properties of the multipath environment are understood. That is, in multipath environments, the path of energy flow between the transmitter and the receiver and the reverse path of energy flow between the receiver and the transmitter may not necessarily be reciprocal. For example, objects exist in the environment that reflect a signal if excited from one direction but absorb the signal if illuminated from the other direction. Furthermore, a channel (or path of energy flow between objects) can vary with time. For example, a moving object can obstruct a path of energy flow between objects between the objects in one direction but not the other. In such a case, the measurement diversity allows the system to identify and/or otherwise account for this (e.g., by repeating the calculation in the direction in which the objection temporality obstructed the path of energy flow between the objects).

Figure 6A:
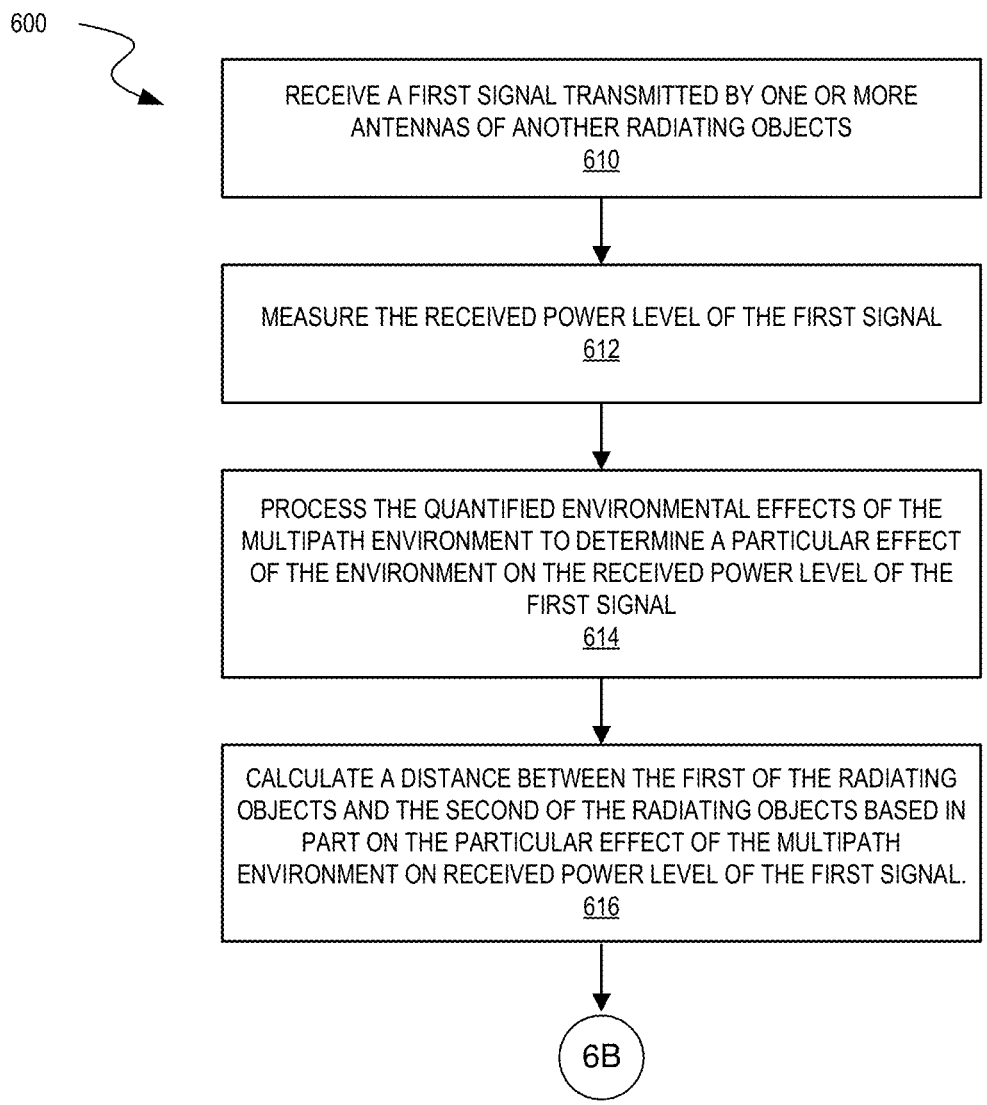
FIGS. 6A and 6B are data flow diagrams illustrating an example process of calculating the distance between radiating objects in a multi-path environment, according to some embodiments.
Figure 6B:
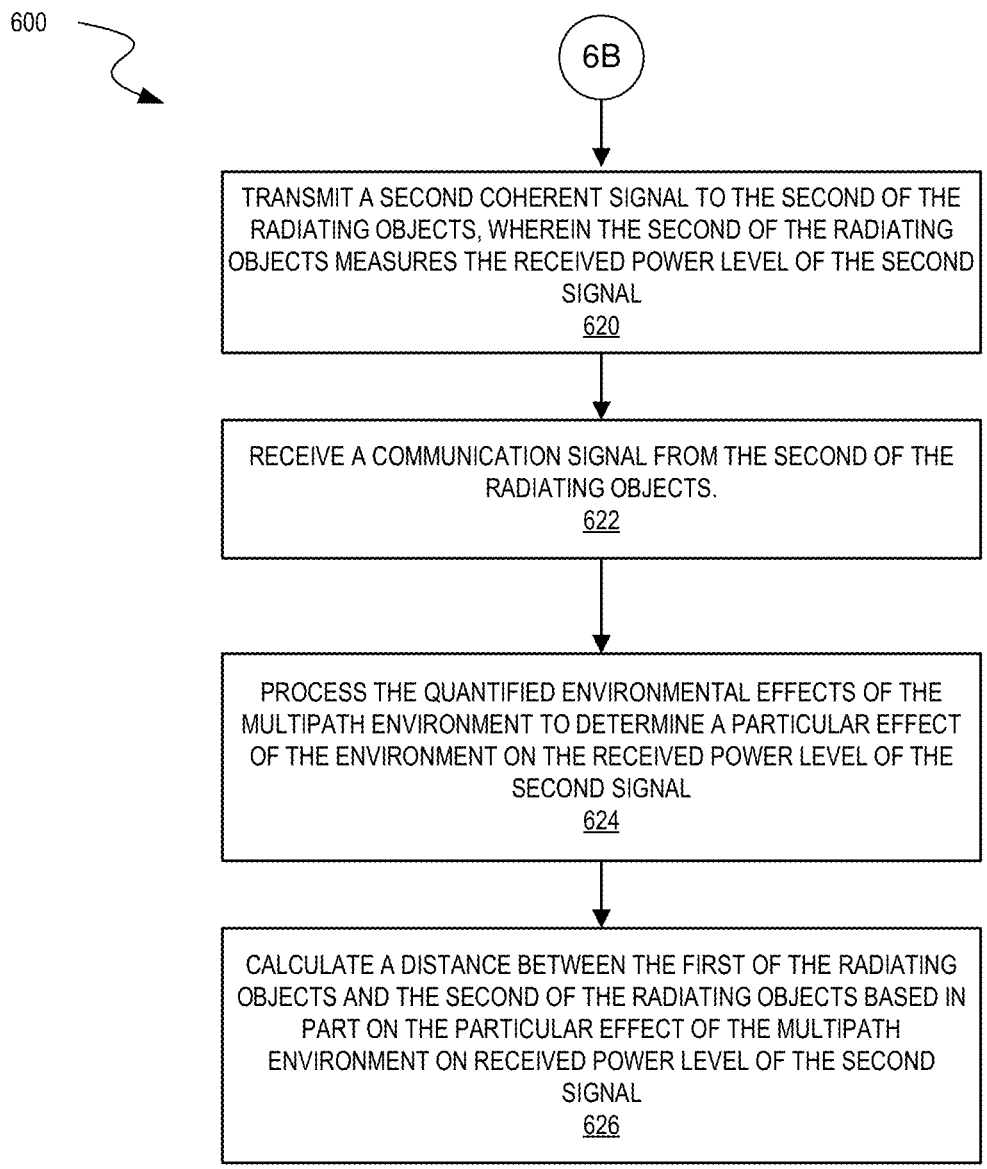

FIGS. 6A and 6B are data flow diagrams illustrating an example process 600 of calculating the distance between radiating objects in a multi-path environment, according to some embodiments. Components of a first radiating object, e.g., a wireless charger 101 or a wireless device 102 of FIG. 1, can, among other functions, perform the example process 600.

As a preliminary matter, the example of FIGS. 6A and 6B assume that a calibration procedure or process has been performed by a radiating object (e.g., an antenna array system or charger) to quantify and/or otherwise account for the environmental effects of the multi-path environment on signals received by radiating objects within the multipath environment. The calibration procedure or process is discussed in greater detail with reference to FIG. 9. However, as a general matter, calibrating the multipath wireless power delivery environment allows an antenna array system to quantify the environmental effects of the multipath environment on signals received by radiating objects within the environment. The environmental effects can increase or decrease, e.g., dampen or attenuate power levels, e.g., amplitude or signal strength, of the signals received by the radiating objects based on reflective or absorptive objects or surfaces within the multipath environment. As described above, once calibrated, the distance between the radiating objects in the multi-path environment can be calculated using a modified Friis equation.

If the radiating object of FIGS. 6A and 6B is a wireless charger, then the wireless charger first calibrates the multipath wireless power delivery environment to quantify environmental effects of the multipath environment on signals received by radiating objects within the environment. Various calibration techniques are shown and discussed in greater detail with reference to FIGS. 8 and 9. Alternatively, if the radiating object of FIGS. 6A and 6B is a wireless device having one or more embedded wireless power receivers, then the wireless device may optionally receive the quantified environmental effects of the multipath environment from the charger prior to computing a distance.

At process 610, a first radiating object receives, via one or more antennas, a first signal transmitted by one or more antennas of a second radiating object. In some embodiments the first signal is a beacon signal received at an array, however, the first signal could also be a coherent signal received at a wireless power receiver.

At process 612, the first radiating object measures the received power level, e.g., amplitude or signal strength, of the first signal. In some embodiments, the first radiating object may also measure the phase of the first signal. At process 614, the first radiating object processes the quantified environmental effects of the multipath environment to determine a particular effect of the environment on the received power level of the first signal. For example, the quantified environmental effects of the multipath environment can indicate that the received signal is dampened/ attenuated by a known amount or quantity as, for example, measured in decibels. Additionally, the first radiating object can also optionally process the quantified environmental effects of the multipath environment to identify one or more effects of the multipath environment on the received phase of the first signal.

At process 616, the first radiating object calculates a distance between itself and the second radiating object based in part on the particular effect of the multipath environment on received power level of the first signal. In some embodiments, the distance determination may be further based on the one or more effects of the multipath environment on the received phase of the first signal. As discussed herein, the distance between the first radiating object and the second radiating object can be calculated using a modified Friis equation wherein a transmitted power level of the first signal, a gain value of the one or more antennas of the first radiating object, and a gain value of the one or more antennas of the second radiating object are known.

Referring now to FIG. 6B, in some embodiments the process of FIG. 6A can continue in order to make a two-way measurement and introduce measurement diversity. As discussed above, in wireless power delivery environments, two-way (or two-step) measurements are possible because both ends of the link are active devices (e.g., radiating objects) that collaborate and communication with one another.

At process 620, the first radiating object transmits a second coherent signal to the second radiating object. In the example of FIG. 6B, the second radiating object measures the received power level of the second signal. In some embodiments, the first radiating object may also measure the phase of the second signal. At process 622, the first radiating object receives a communication signal from the second radiating object. The communication signal includes the received power level of the second signal as measured by the second radiating object. In some embodiments, the communication signal can also include the phase of the second signal as measured by the second radiating object (this. In some embodiments, the communication signal is communicated by way of a data channel, e.g., Wi-Fi, Bluetooth, ZigBee, etc.

At process 624, the first radiating object process the quantified environmental effects of the multipath environment to determine a particular effect of the environment on the received power level of the second signal. At process 626, the first radiating object calculates a distance between itself and the second radiating object based in part on the particular effect of the multipath environment on received power level of the second signal. In some embodiments, the distance determination may be further based on the one or more effects of the multipath environment on the received phase of the second signal. As discussed herein, the distance between the first of the radiating objects and the second of the radiating objects can be calculated using a modified Friis equation wherein a transmitted power level of the second signal, a gain value of the one or more antennas of the first radiating object, and a gain value of the one or more antennas of the second radiating object are known.

Figure 7:
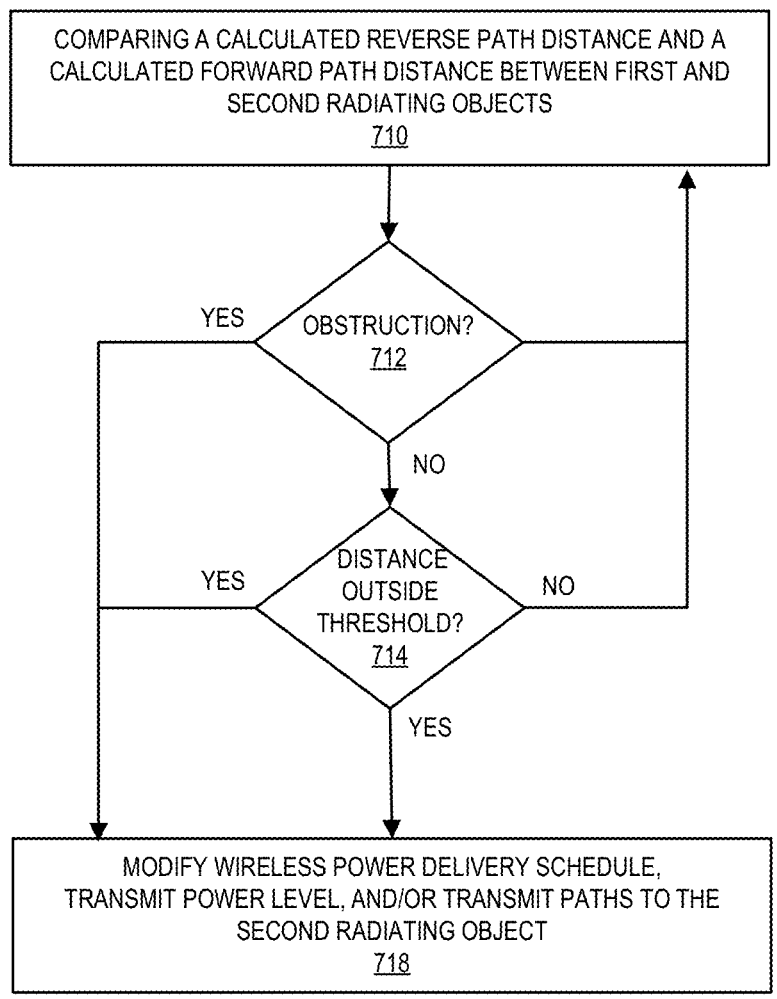
FIG. 7 is a data flow diagram illustrating an example process of calculating the distance between radiating objects in a multi-path environment and performance of a subsequent action, according to some embodiments.

FIG. 7 is a data flow diagram illustrating an example process 700 of calculating the distance between radiating objects in a multi-path environment and performance of a subsequent action, according to some embodiments. Components of a first radiating object, e.g., a wireless charger 101 or a wireless device 102 of FIG. 1, can, among other functions, perform the example process 700. For simplicity of discussion only, the example of FIG. 7 will be discussed with respect to a wireless charger.

To begin, the example process 700 assumes that at least one forward and reverse distance between the wireless charger (e.g., first radiating object) and a wireless device (e.g., second radiating object) in a multipath wireless power delivery environment has been calculated. At process 710, the wireless charger compares the calculated reverse path distance between wireless charger and the wireless device to the calculated forward path distance between the wireless device and the wireless charger.

At decision process 712, the wireless charger determines if an obstruction or blockage is detected between itself and the wireless device. For example, an obstruction would likely dampen/attenuate a received signal by a known amount (measured in x dB) in both directions. If an obstruction is detected, the wireless charger can modify the wireless power delivery schedule and/or transmit power level for the second radiating object at process 718.

At decision process 714, the wireless charger determines if the calculated distance is outside a threshold. The calculated distance is outside a threshold if, for example, it is less than a minimum threshold or exceeds a maximum threshold value. Although discussed in the context of FIG. 7, the threshold determination of process 714 can be applied to any single distance calculation (e.g., just a forward path distance determination or just a reverse path distance determination). If the calculated distance is outside a threshold, the wireless charger can modify the wireless power delivery schedule and/or transmit power level for the wireless device at process 718.

At process 718, the wireless charger modifies the wireless power delivery schedule, transmit power level, and/or transmit paths to the wireless device to adjust the amount of power delivered to the wireless device. Combinations and/or variations of the power modification techniques discussed herein are also possible.

In some embodiments, modifying the transmit paths to the wireless device (e.g., second radiating object) include first identifying the multiple paths over which the power transmission signal delivers radio frequency power to the wireless device. Once the paths are identified, the wireless charger can then determine a quantity of power that is delivered to the wireless device by way of one or more of the multiple paths where the multiple paths collectively deliver a total quantity of power to the wireless device. Next, a subset of the multiple paths over which to transmit a next radio frequency power transmission signal to the wireless device are selected to, for example, reduce the total quantity of power delivered to the wireless device. For example, as discussed herein, the wireless charger includes various means for identifying that the wireless device is in the line of sight. This means that the wireless charger will be sending a direct signal (i.e., line of site) to the wireless device over which more power is likely to be transmitted. Consequently, the wireless charger can discover the direct path (i.e., line of site path) and remove it from the power delivery cycle in order to reduce the total amount of power delivered to the wireless device. As discussed herein, reducing the total amount of power to a device can be useful to avoid for example, overpowering the wireless device.

Figure 8:
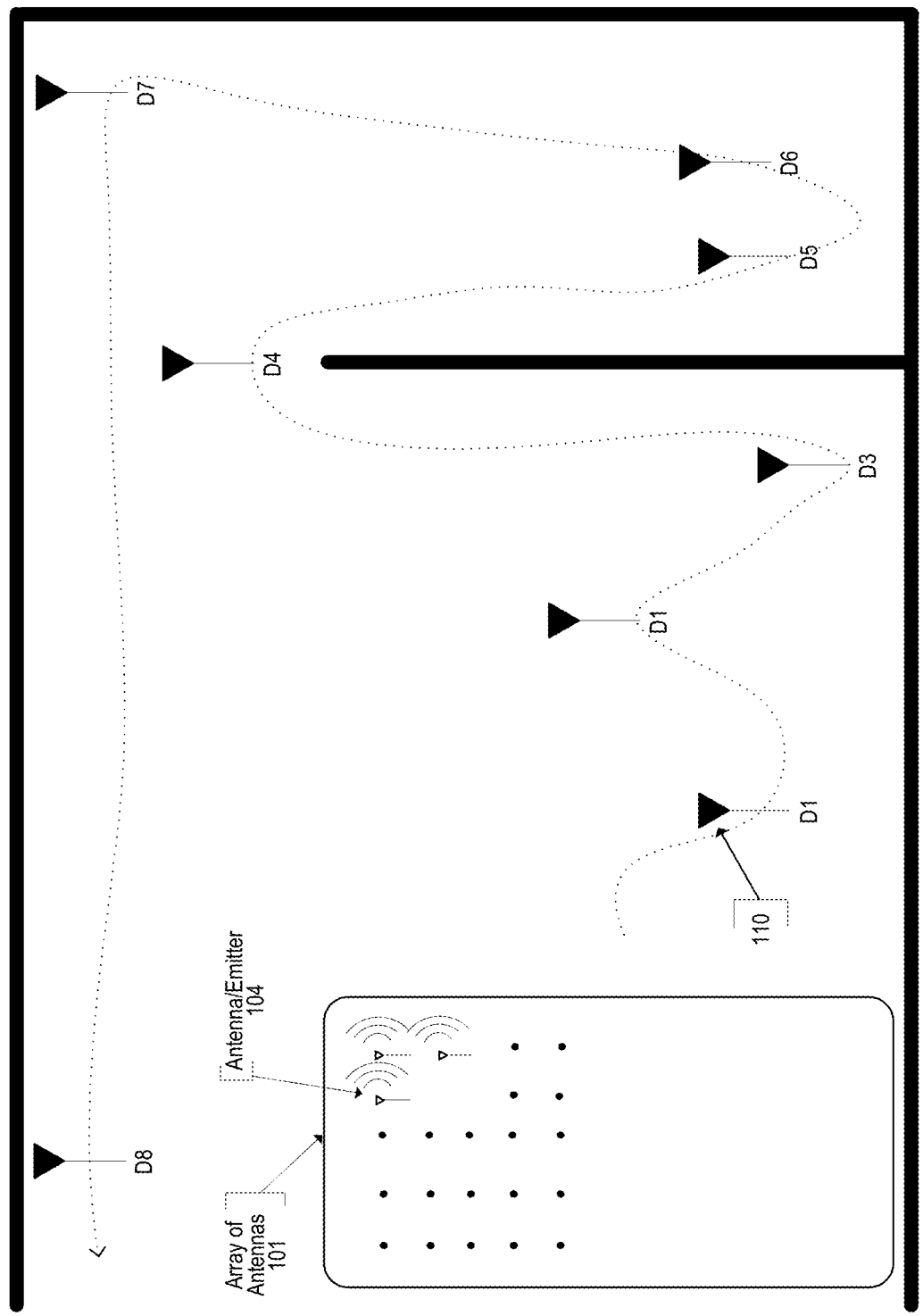
FIG. 8 is a block diagram illustrating an example calibration technique in which data for quantifying the multipath wireless power delivery environment is collected from one or more wireless power receiver clients (or calibration antennas) over a period of time ("collection over time calibration technique"), according to an embodiment.

FIG. 8 is a block diagram illustrating an example calibration technique or environment in which data for quantifying the multipath wireless power delivery environment is collected from one or more wireless devices having one or more power receiver clients (or calibration antennas having one or more power receiver clients) over a period of time ("collection over time calibration technique"), according to an embodiment. More specifically, as illustrated in the example of FIG. 8, one or more calibration antennas 110 are incrementally moved around the multipath environment and power level (or signal strength) measurements are made at various locations D1-D8 along the path. As discussed herein, the various measurements quantify the environmental effects of the multi-path environment on signals received by radiating objects within the environment. As discussed herein, the radiating objects can be wireless chargers or wireless devices having one or more wireless power receivers.

Once competed, calibration measurements can be aggregated and stored. As discussed in more detail below, the stored calibration measurements can be processed (e.g., by a wireless charger) to derive the F1(Environment) and F2(R) variables for distance determinations. Alternatively or additionally, the calibration measurements can also be used in tables such as the table shown and discussed in greater detail with reference to FIG. 10.

In some embodiments, calibrating the multipath environment to quantify environmental effects of the multipath environment signals received by the radiating objects includes determining multipath loss functions that collectively define the multipath environment (e.g., F1(Environment) and/or F2(R)), and wherein the one or more multipath loss equations or functions that collectively define the multipath environment comprise separable functions of the multipath environment and distance. As discussed above, the measurements made during calibration are used to derive these variables.

Figure 9:
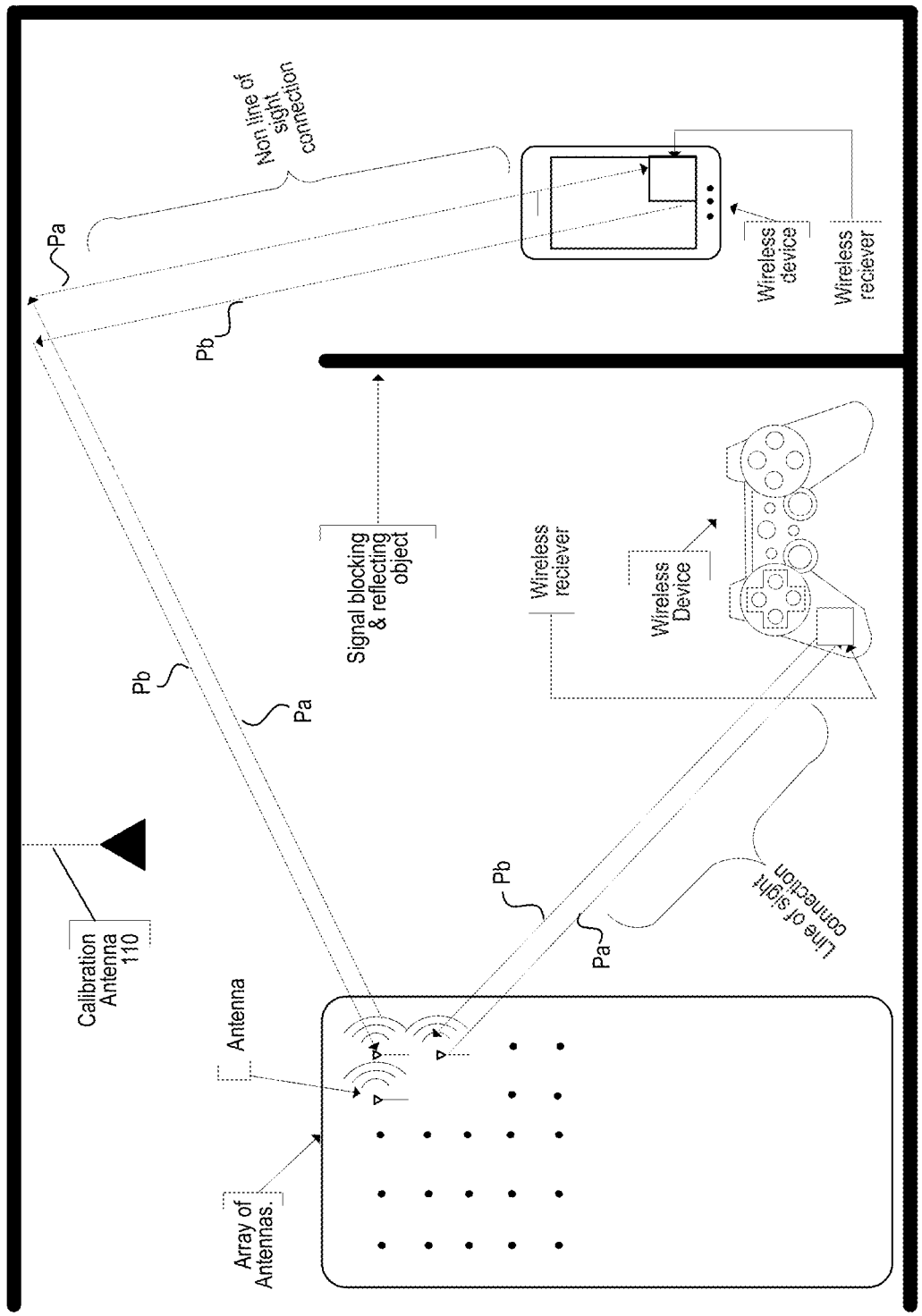
FIG. 9 depicts a block diagram illustrating an example calibration technique in which power level (or signal strength) measurements are made from one or more static or fixed calibration antennas to quantify the environmental effects of the multi-path environment by measuring the environment signal effects (e.g., loss or gain) over a period of time.

In addition to the collection over time calibration technique, other calibration techniques are also possible. For example, FIG. 9 depicts a block diagram illustrating an example calibration technique in which power level (or signal strength) measurements are made from one or more static or fixed calibration antennas 110 to quantify the environmental effects of the multi-path environment by measuring the environment signal effects (e.g., loss or gain) over a period of time. In some embodiments, the location and distance of the static measurements are known. Because the distance is known, the values of the unknown variables e.g., F1(Environment) and/or F2(R) can be determined for particular distance. For example, if the wireless charger measures the distance to be $D1_{MEASURED}$ and the known distance is $D1_{KNOWN}$, then the wireless charger knows that the unknown loss variables e.g., F1(Environment) and/or F2(R) had no effect on the distance determination and are unity. However, as discussed herein, multipath has an effect.

In some embodiments, one or more large matrices or vectors can be empirically created, generated, and/or otherwise maintained to include the information about the values of the F1(Environment) and/or F2(R) variables. Consequently, the static or fixed antennas can calibrate the environment and periodically check for changes in the environment. The measurements can be performed manually to identify the effects of the environment on the signals. As discussed herein, this information facilitates an accurate measurement of the distance between two radiating objects, such as the charger and the wireless power receiver in the wireless device. The calibration antennas 110 can be attached to the charger and/or separate distinct antennas.

In some embodiments, a calibration technique in which data for quantifying the multipath wireless power delivery environment is collected from one or more wireless power receiver clients (or calibration antennas) over space ("collection over space calibration technique"). For example, charger 101 can progressively activate one or more antennas of a radiating object and measure power level (or signal strength) measurements using the activated antennas. As discussed herein, this information facilitates an accurate measurement of the distance between the charger and the client. In some embodiments, this sampling or data collection can be performed by one of more antennas at $\lambda/2$ or some other predetermined element spacing in the antenna array in order to characterize and/or otherwise quantify the multipath characteristics of the received signal as some antennas experience greater destructive interference (fading) effects while others will experience higher signal levels due to constructive interference.

In some embodiments, the calibration techniques can be performed in real-time during the pairing process described above. Alternatively, the calibration techniques can be performed before clients are present in the vicinity of the charger using a calibration antenna 110. Although not illustrated herein, other calibration techniques including combinations and variations of the techniques described herein are also possible.

Figure 10:
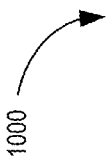
FIG. 10 is an example range lookup table constructed to contain the quantified environmental effects of the multipath environment, according to some embodiments.

FIG. 10 is an example range lookup table 1000 constructed to contain the quantified environmental effects of the multipath environment, according to some embodiments. As discussed herein, during a calibration procedure data is collected to quantify the multipath wireless power delivery environment. A range lookup table with any number of indexes can be used to contain this information. Alternatively or additionally, multiple equations can be derived with the same or similar variables. Other variables and/or indexes are also possible.

In the example of FIG. 10, a charger (or array system or other radiating object or receiver) populates the table during the calibration process. As discussed above, the calibration techniques can collect data over time and thus the range lookup table 1000 can be dynamically updated based on changes occurring in the wireless power delivery environment. As illustrated in the example of FIG. 10, two indices are used for each of one or more antennas at the charger to determine a range (or distance). It is appreciated that any number of indices can be used (including a single indicia). However, as illustrated in the example, of FIG. 10, the two indices include a received power level and a received phase.

The indices comprise measured values. For example, a beacon signal can be received at an array where the power level (or signal strength) and phase are measured by one or more antennas. In some embodiments, this measured information can then be used to identify a corresponding range in the wireless power delivery environment. Although not illustrated, the information can alternatively or additionally then be used to identify the F1(Environment) and/or F2(R) variables as described herein.

Figure 11:
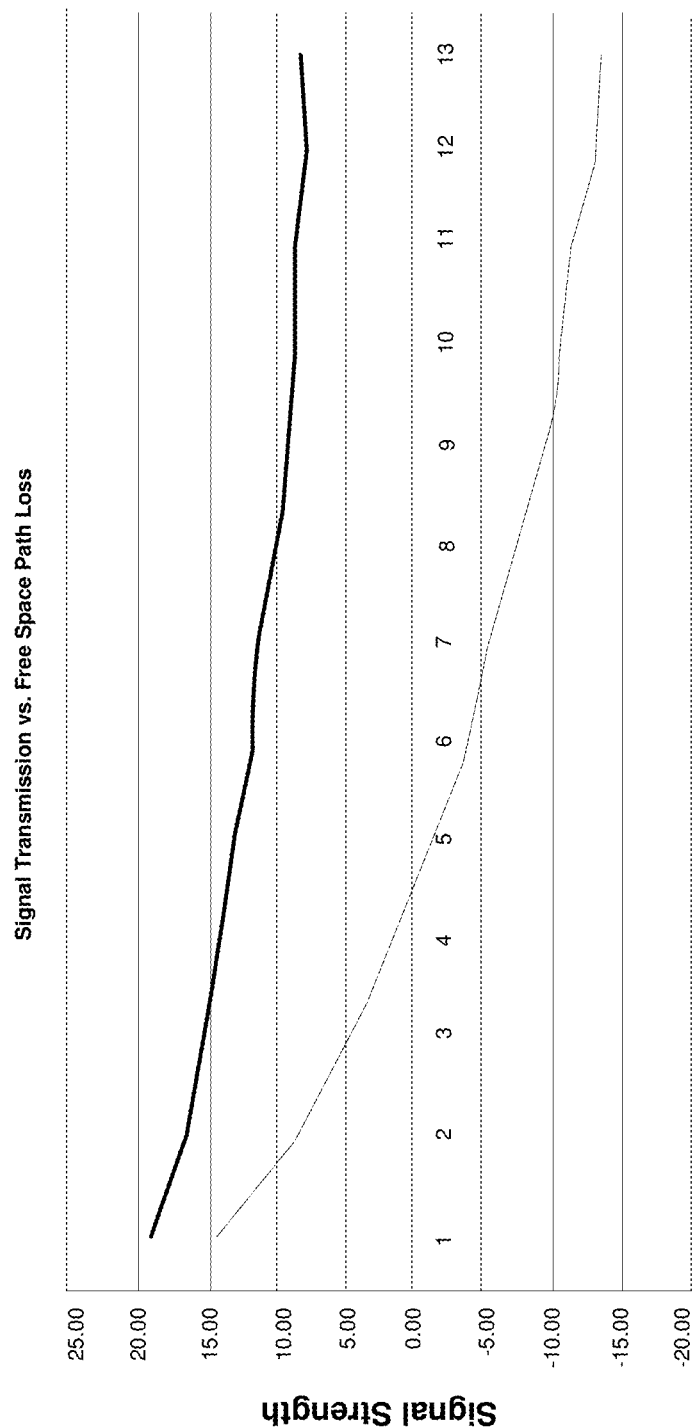
FIG. 11 is a graph illustrating signal strength transmission vs free space path loss and phase summation as a function of time, respectively.

FIG. 11 is a graph illustrating example signal strength transmission measurements taken using the modified Friis equation described herein vs. the unmodified Friis equation, according to an embodiment. More specifically, the top (bold) curve is an example of signal strength measurements taken in a multipath environment at increasing distances using the modified Friis equation. The bottom curve is the measurements taken at the same distances using the unmodified Friis equation for free space in a close to ideal environment (e.g., relatively open outdoor environment). The distance shown in the example of FIG. 11 can indicate feet, however, it is appreciated that FIG. 11 is merely an example and that signal strength loss is highly dependent on the particular multipath environment.

In some embodiments, one or more entries of the range lookup table can be used to develop the graph of FIG. 11. Furthermore, at any given distance, the delta or difference between the signal strength transmission measurements made using the modified Friis equation (top curve) and the unmodified Friis equation (bottom curve) represent the effects of the multipath environment on received signals (e.g., the F1(Environment) and/or the F2(R) variables as described herein).

Example Distance Determination Calculations

Figure 12A:
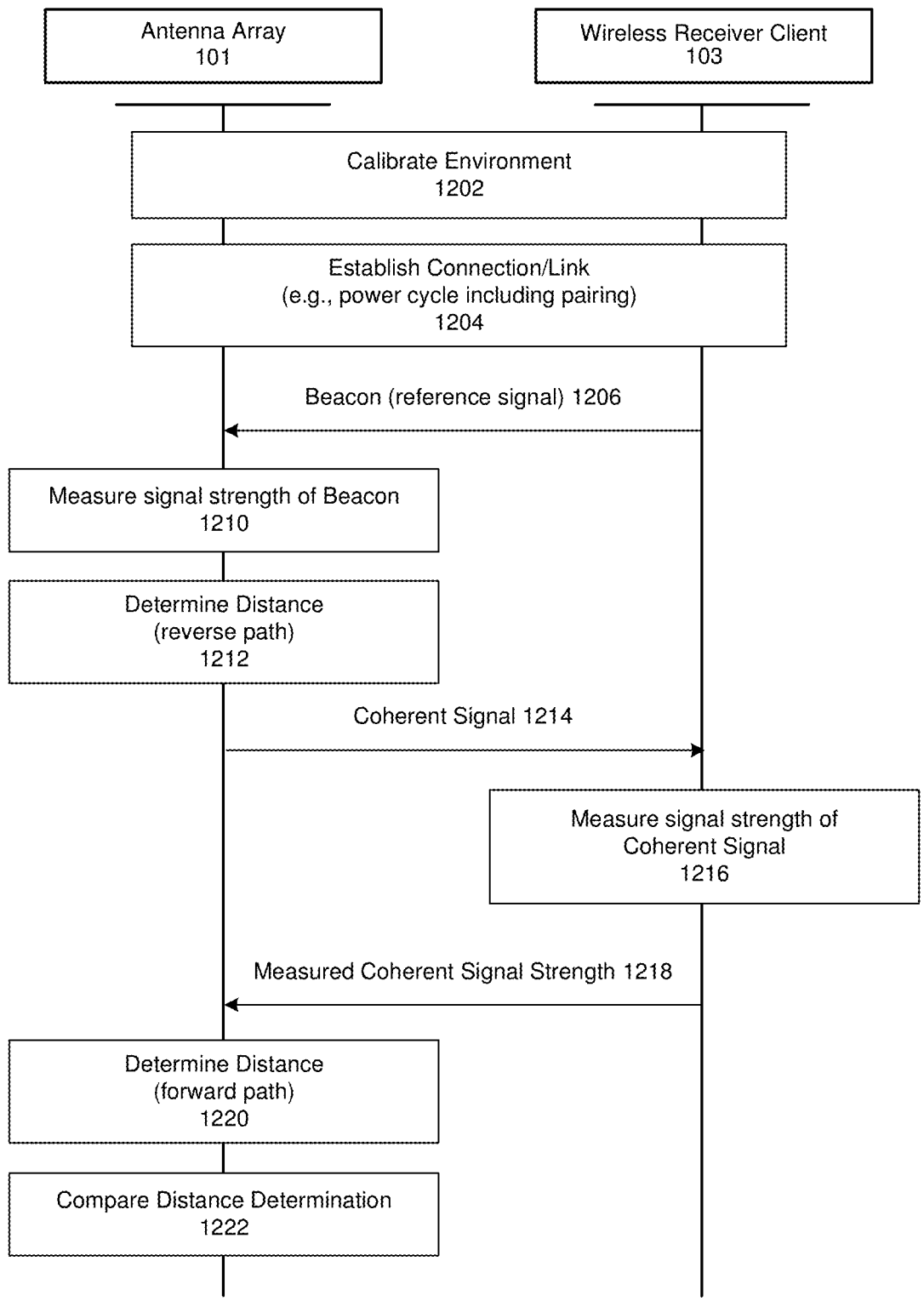
FIGS. 12A-12C are sequence diagrams illustrating various example techniques for facilitating distance determination between an array of antennas (or charger) and a wireless receiver in a multi-path wireless power delivery environment, according to some embodiments.
Figure 12B:
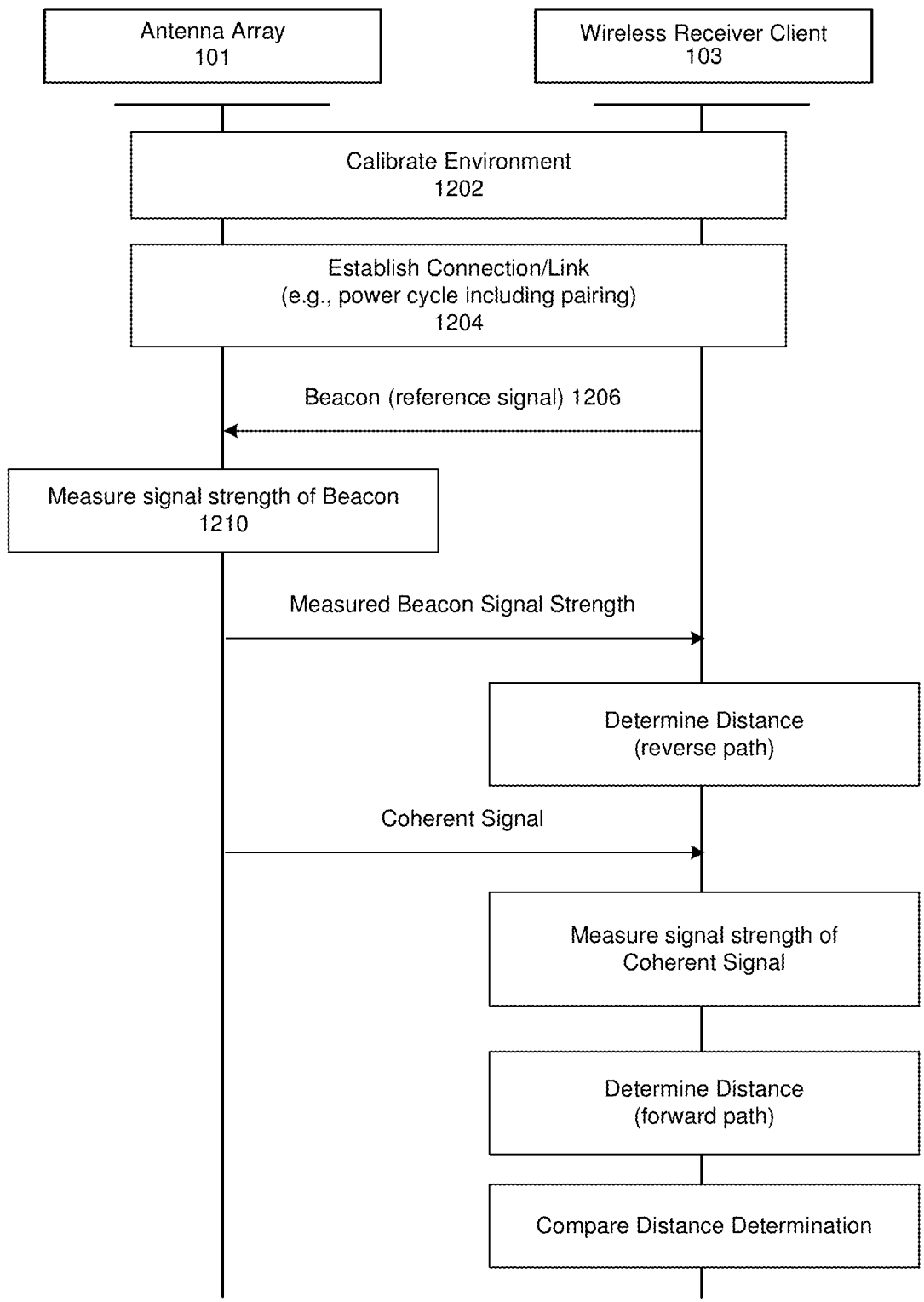
Figure 12C:
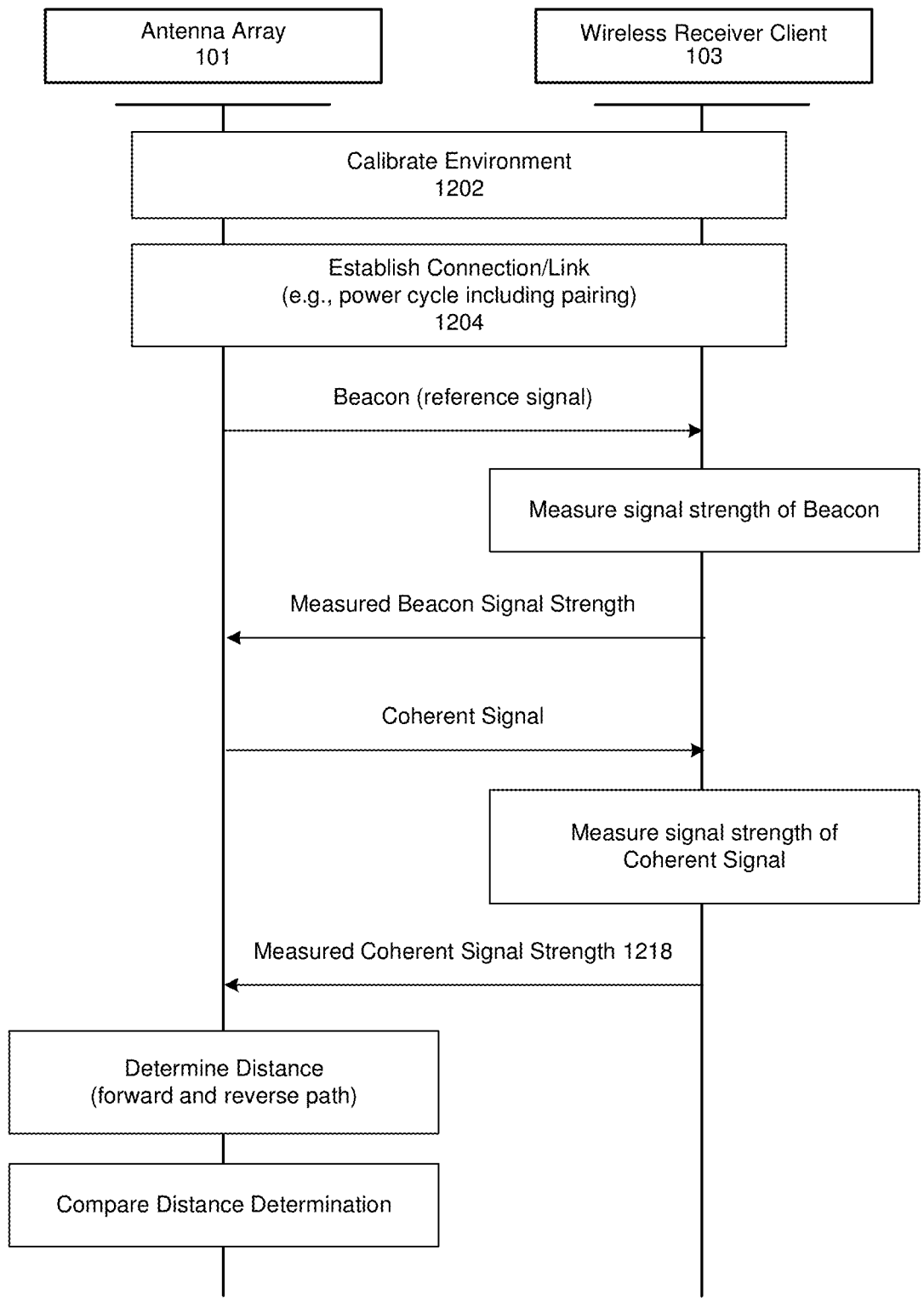

FIGS. 12A-12C are sequence diagrams illustrating various example techniques for facilitating distance determination between an array of antennas (or charger) and a wireless receiver in a multi-path wireless power delivery environment, according to some embodiments.

Referring first to FIG. 12A, which illustrates an example of distance determination between an array of antennas and a wireless receiver in a multi-path environment, according to some embodiments, to begin, at step 1202, the multi-path environment is calibrated to quantify environmental effects of the multi-path environment on signals received by a radiating object within the environment. Alternatively or additionally, as discussed above, in some embodiments the calibration process can be performed in real-time during the pairing process. In this example, the array of antennas has multiple antennas and the wireless receiver has one or more antennas. The antennas at either end may be placed in a specific orientation relative to each other to optimize performance.

At step 1204, a communication link or connection is established. As described herein, the system power cycle includes the process of pairing and, once paired, the array and the client have an established link for facilitating transfer of power and/or data communications.

At step 1206, the receiver "client" sends out a single continuous wave signal for a specific amount of time "$B_C$." The duration of time in which the client is transmitting (Bc) should be properly selected to offer enough time for the array to process the received signal and also to avoid range ambiguity based on radar theory. As discussed above, in wireless power delivery environments, the beacon signals are used by the array as a pilot signal to guide the array for power delivery. In the examples described herein, the beacon is also used to determine distance.

The beacon signal is received by the array and, at step 1210, a power level (or signal strength) "$P_B$" of the received beacon signal is measured. At step 1212, the reverse path distance is determined using the modified Friis equation as described herein. It is appreciated that the array can perform this step at any point prior to the comparison at step 1222.

At step 1214, the array delivers a coherent signal to the client from one or more antennas of the multiple antennas of the array. The one or more antennas are phased to deliver the coherent signal to the client. At step 1216, the client measures the power level (or signal strength) of the signal received coherent signal "PA". At step 1218, the receiver "client" communicates the measured signal strength of the coherent signal back to the antenna array.

At step 1220, the forward path distance is determined using the modified Friis equation as described herein. Lastly, at step 1222, the array compares the forward path distance and the reverse path distances. For example, if there is an obstruction between the two devices (receiver and array) that dampens/attenuates the signal by a known amount (measured in x dB), then both the array signal and the client signal should be reduced by the same dB. This allows for the determination that a blockage is discovered between the two devices. In some embodiments, the system can identify the obstructing object and in some instances, e.g., if the object is a human, can take specific actions. For example, the if the obstruction is a human, the array can stop or reduce power delivery to the client as a safety precaution. Other actions are also possible.

FIG. 12B is similar to the example of FIG. 12A, except that the distance determinations and/or comparisons of the distance determinations are made at the wireless receiver client as opposed to the antenna array.

FIG. 12C illustrates operation of at least one antenna beaconing the wireless receiver clients from the antenna array. In this example, distance is calculated by an array. However, the array includes one or more separate antennas configured to send the beacon signals.

It is appreciated that both the antenna array and the wireless receiver client 103 may each have one or more antennas that are active in the distance determination process. Furthermore, combinations and variations of the various steps discussed are possible.

Figure 13:
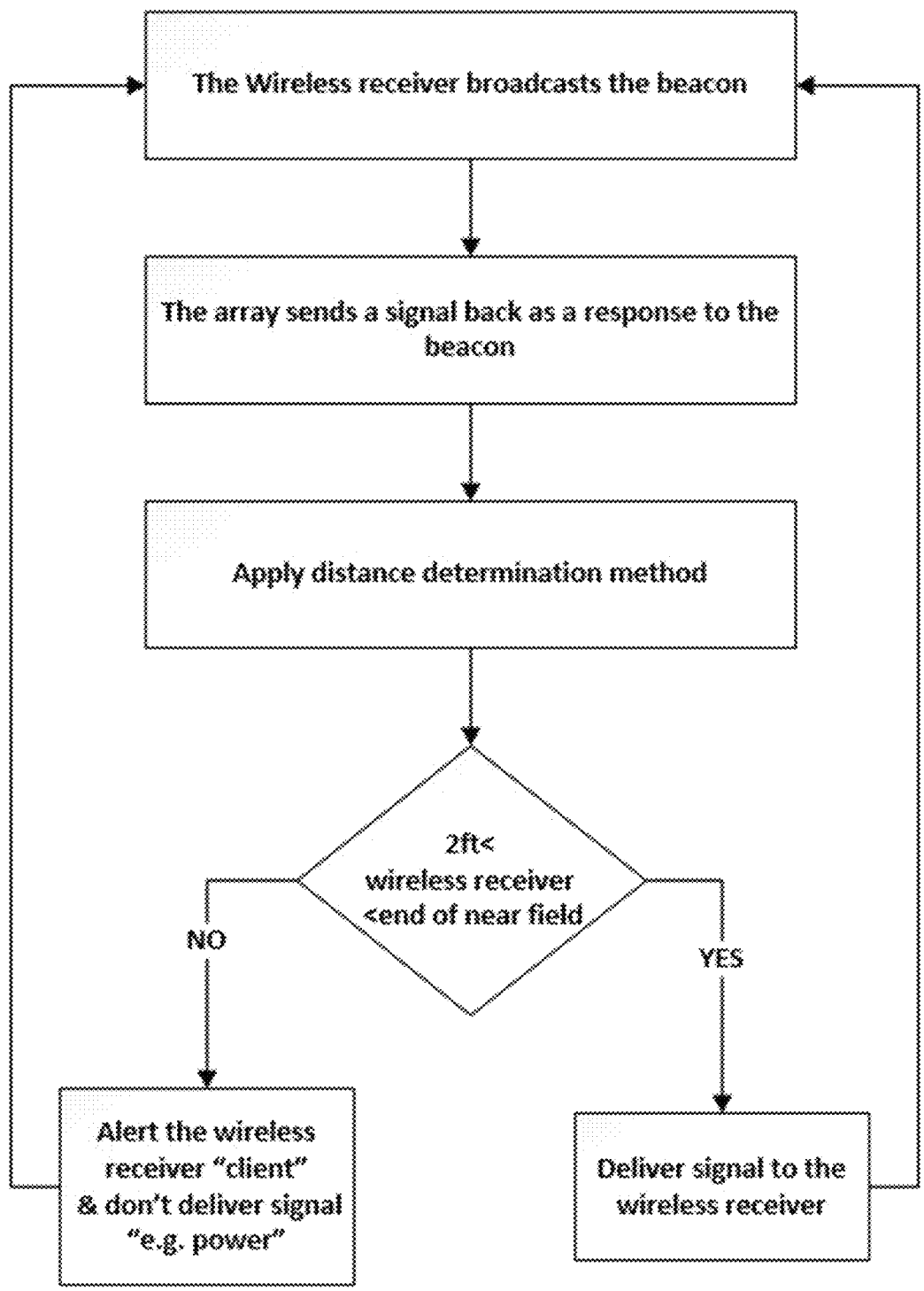
FIG. 13 illustrates an example near field distance determination, according to an embodiment.

FIG. 13 illustrates an example near field distance determination, according to an embodiment. In the example of FIG. 13, a beacon signal is received by the array and a power level (or signal strength) of the received beacon signal is measured. The reverse path distance is then determined using the modified Friis equation as described herein. The distance is then used to modify the power delivery scheduled to the wireless power receiver via the phased coherent signal. For example, if measured distance indicates that the wireless power receiver is closer than a near threshold distance (e.g. one meter, two feet, etc.), then an alert is sent to the wireless power receiver and the array suspends wireless power transmission via the phased coherent signal.

Although not illustrated in the example of FIG. 13, if the measured distance indicates that the wireless power receiver is closer than a far threshold distance (e.g., too far to receive power or near the far threshold), the array may send a notification to the wireless power receiver so that a user of the device can keep it within range of the charger for sufficient communication and other actions, e.g. "pairing, exchange data, etc.". The signal strength may reach unsafe levels if the client is less than the specified distance from the array, or may diminish if the distance exceeds the near field area of the array.

Example Systems

Figure 14:
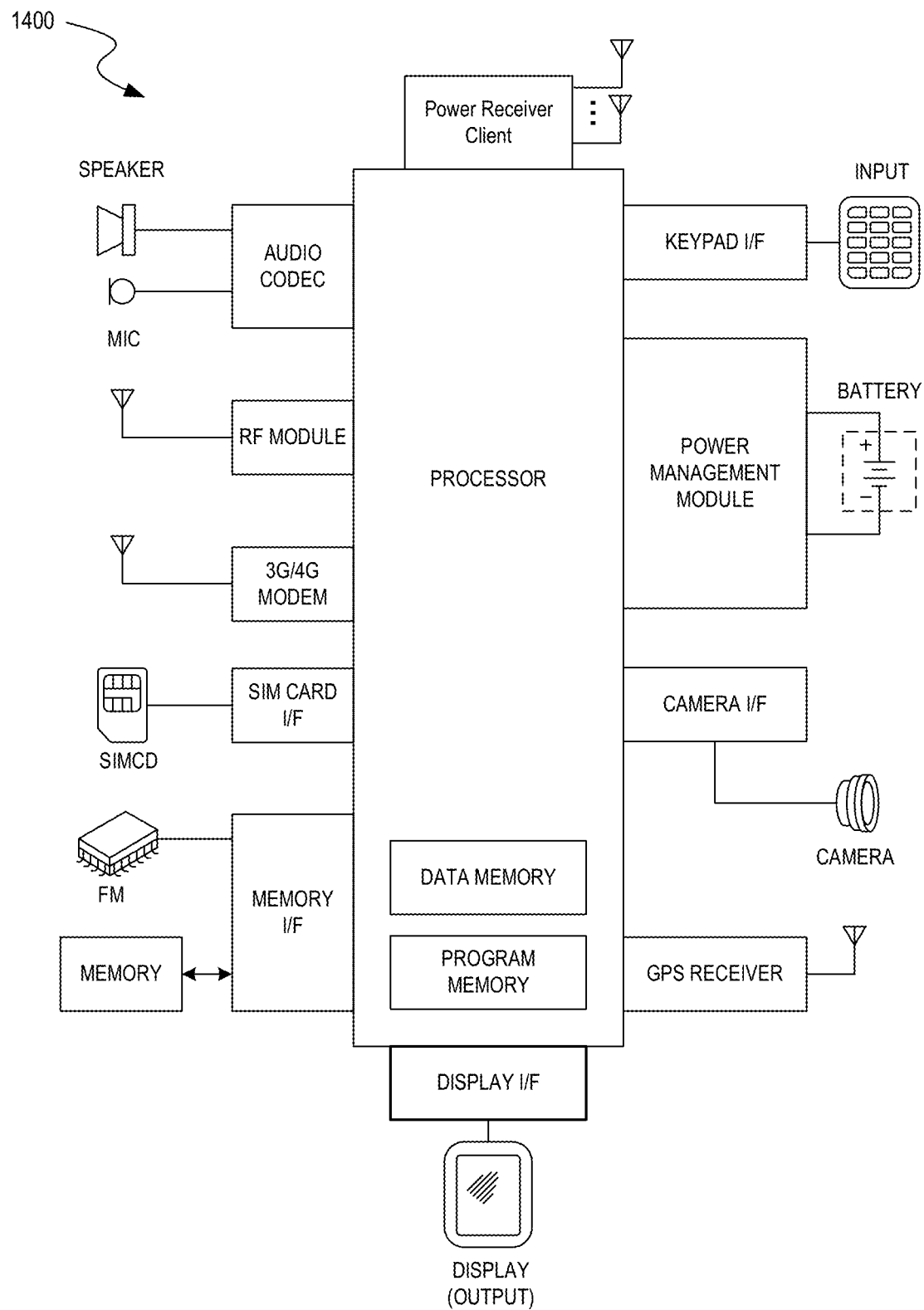
FIG. 14 depicts a block diagram illustrating example components of a representative mobile device or tablet computer with a wireless power receiver or client in the form of a mobile (or smart) phone or tablet computer device, according to an embodiment.

FIG. 14 depicts a block diagram illustrating example components of a representative mobile device or tablet computer 1400 with a wireless power receiver or client in the form of a mobile (or smart) phone or tablet computer device, according to an embodiment. Various interfaces and modules are shown with reference to FIG. 14, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 15:
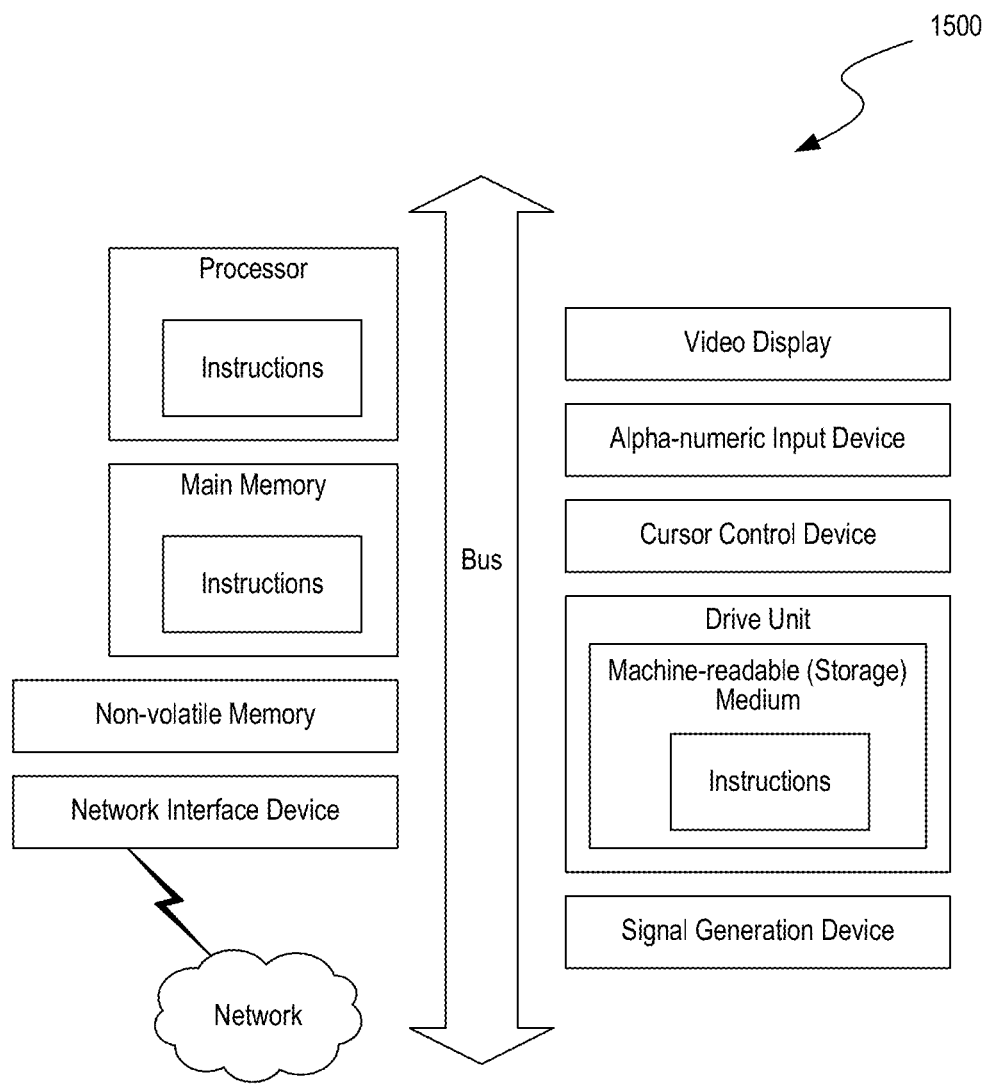
FIG. 15 depicts a diagrammatic representation of a machine, in the example form, of a computer system within which a set of instructions, for causing the machine to perform any one or more of the methodologies discussed herein, may be executed.

FIG. 15 depicts a diagrammatic representation of a machine, in the example form, of a computer system within which a set of instructions, for causing the machine to perform any one or more of the methodologies discussed herein, may be executed.

In the example of FIG. 15, the computer system includes a processor, memory, non-volatile memory, and an interface device. Various common components (e.g., cache memory) are omitted for illustrative simplicity. The computer system 1500 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure may be recited as a means-plus-function claim under 35 U.S.C. § 112(f), other aspects may likewise be embodied as a means-plus-function claim, or in other forms, such as being embodied in a computer-readable medium (Any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method comprising:
    calibrating a multipath wireless power delivery environment (MWPDE) to quantify environmental effects of the MWPDE on signals received by radiating objects positioned in the MWPDE,
        wherein the environmental effects increase or decrease power levels of the signals received by the radiating objects based on reflective or absorptive objects or surfaces within the MWPDE;
    receiving, by a first of the radiating objects, a first signal transmitted by a second of the radiating objects;
    first measuring, by the first of the radiating objects, a received power level of the first signal;
    processing the quantified environmental effects of the MWPDE to determine a particular effect of the MWPDE on the received power level of the first signal; and
    calculating, by the first of the radiating objects, a first distance between the first, and the second, of the radiating objects based, at least in part, on the particular effect of the MWPDE on received power level of the first signal;
    transmitting, by the first of the radiating objects, a second signal to the second of the radiating objects;
    second measuring, by the second of the radiating objects, a received power level of the second signal representative of a total quantity of radio frequency (RF) power;
    identifying, based on the second measuring, a subset of multiple paths in the MWPDE over which the second signal delivers the total quantity of RF power to the second of the radiating objects; and
    transmitting, by the first of the radiating objects and based on the identifying, at least a third signal to the second of the radiating objects to reduce the total quantity of RF power delivered to the second of the radiating objects.

2. The method of claim 1, wherein:
    transmitting a second signal to the second of the radiating objects comprises transmitting a coherent power transmission signal to the second of the radiating objects.

3. The method of claim 1, further comprising determining a quantity of RF power that is delivered to the second of the radiating objects by way of one or more of the multiple paths, wherein the multiple paths collectively deliver the total quantity of RF power to the second of the radiating objects.

4. The method of claim 1, further comprising:
    processing the quantified environmental effects of the MWPDE to determine a particular effect of the MWPDE on the received power level of the second signal; and
    calculating, by the first of the radiating objects, a second distance between the first, and the second, of the radiating objects based, at least in part, on the particular effect of the MWPDE on the received power level of the second signal.

5. The method of claim 4, further comprising:
    comparing the first distance and the second distance to determine if an obstruction exists between the first, and the second, of the radiating objects in the MWPDE,
        wherein the first distance is representative of a reverse path distance, and
        wherein the second distance is representative of a forward path distance.

6. The method of claim 1, further comprising:
    modifying, by the first of the radiating objects, a transmit power level specific to the second of the radiating objects if the first distance between the first, and the second, of the radiating objects is less than a minimum threshold or exceeds a maximum threshold value.

7. The method of claim 1, further comprising modifying a wireless power schedule for power delivery in the MWPDE.

8. The method of claim 1, wherein calibrating the MWPDE comprises progressively activating the one or more antennas of the first of the radiating objects and measuring power levels of received signals within the MWPDE.

9. The method of claim 1, wherein calibrating the MWPDE comprises incrementally measuring power levels of received signals that are transmitted between the first of the radiating objects and a calibration antenna at various locations within the MWPDE.

10. The method of claim 1, wherein calibrating the MWPDE comprises measuring power levels of received signals that are transmitted between the first of the radiating objects and one or more static or fixed calibration antennas.

11. The method of claim 1, further comprising:
   measuring a received phase of the first signal,
      wherein the environmental effects vary phases of the signals received by the radiating objects based on the reflective or absorptive objects within the MWPDE;
   processing the quantified environmental effects of the MWPDE to identify one or more effects of the MWPDE on the received phase of the first signal,
   wherein calculating the first distance between the first, and the second, of the radiating objects comprises calculating the first distance further based on the one or more effects of the MWPDE on the received phase of the first signal.

12. The method of claim 1, wherein calibrating the MWPDE to quantify environmental effects of the MWPDE signals received by the radiating objects comprises determining one or more multipath loss equations or functions that collectively define the MWPDE, and wherein the one or more multipath loss equations or functions that collectively define the MWPDE comprise separable functions of the MWPDE and distance.

13. The method of claim 1, further comprising receiving, by the first of the radiating objects, a communication signal transmitted by the second of the radiating objects, wherein the communication signal includes the received power level of the second signal.

14. The method of claim 13, wherein the communication signal is communicated by way of a data channel.

15. A radiating object comprising:
   one or more antennas; and
   control circuitry operatively coupled to the one or more antennas, wherein the control circuitry is configured to:
      measure a received power level of a first signal received from a second radiating object by the one or more antennas;
      process environmental effects of a multipath wireless power delivery environment (MWPDE) to determine a particular effect of the MWPDE on the received power level of the first signal,
         wherein the environmental effects of the MWPDE on signals received by at least the second radiating object within the MWPDE are quantified using a calibration technique;
      calculate a first distance between the radiating object and the second radiating object based, at least in part, on the particular effect of the MWPDE on the received power level of the first signal;
      cause the one or more antennas to transmit a second signal to the second radiating object;
      identify, based on a measurement of a received power level of the second signal representative of a total quantity of radio frequency (RF) power received by the second radiating object, a subset of multiple paths in the MWPDE over which the second signal delivers the total quantity of RF power to the second radiating object; and
      cause, based on the identified subset of multiple paths, at least a third signal to be transmitted to the second radiating object to reduce the total quantity of RF power delivered to the second radiating object.

16. The radiating object of claim 15, wherein the second signal comprises a coherent power transmission signal, and wherein the multiple paths collectively deliver the total quantity of RF power to the second radiating object.

17. The radiating object of claim 15, wherein the control circuitry is further configured to:
   process the quantified environmental effects of the MWPDE to determine a particular effect of the MWPDE on the received power level of the second signal; and
   calculate a second distance between the first radiating object and the second radiating object based, at least in part, on the particular effect of the MWPDE on the received power level of the second signal.

18. The radiating object of claim 17, wherein the control circuitry is further configured to:
   compare the first distance and the second distance to determine if an obstruction exists between the first radiating object and the second radiating object in the MWPDE,
      wherein the first distance is representative of a reverse path distance, and
      wherein the second distance is representative of a forward path distance.

19. The radiating object of claim 15, wherein the control circuitry is further configured to:
   direct the one or more antennas to receive, from the second radiating object, the measurement of the received power level of the second signal via a communication signal transmitted by the second radiating object; and
   responsive to the communication signal being received, determine a quantity of power that is delivered to the second radiating object by way of one or more of the multiple paths, wherein the multiple paths collectively deliver the total quantity of RF power to the second radiating object.

20. A method for calculating a distance from or to a radiating object in a multipath environment, the method comprising:
   receiving a first signal transmitted by the radiating object;
   measuring a received power level and phase of the first signal;
   processing environmental effects of the multipath environment to determine a particular effect of the multipath environment on the received power level of the first signal,
      wherein the environmental effects of the multipath environment on received signals are quantified using a calibration technique, and
      wherein the environmental effects increase or decrease power levels and vary phases of the received signals based on reflective or absorptive objects or surfaces in the multipath environment;
   calculating the distance from or to the radiating object based, at least in part, on the particular effect of the multipath environment on the received power level and phase of the first signal;
   transmitting a second signal to the radiating object;
   identifying, based on a measurement of a received power level of the second signal representative of a total quantity of radio frequency (RF) power received by the radiating object, a subset of multiple paths in the MWPDE over which the second signal delivers the total quantity of RF power to the radiating object; and
   transmitting, based on the identified subset of multiple paths, at least a third signal to the radiating object to reduce the total quantity of RF power delivered to the radiating object.

* * * * *